United States Patent [19]

Schutzman et al.

[11] Patent Number: 5,627,764
[45] Date of Patent: May 6, 1997

[54] AUTOMATIC ELECTRONIC MESSAGING SYSTEM WITH FEEDBACK AND WORK FLOW ADMINISTRATION

[75] Inventors: Jeffrey A. Schutzman, Topsfield; Eugene H. Lee, Cambridge, both of Mass.

[73] Assignee: Banyan Systems, Inc., Westboro, Mass.

[21] Appl. No.: 74,244

[22] Filed: Jun. 9, 1993

Related U.S. Application Data

[63] Continuation-in-part of Ser. No. 11,346, Jan. 29, 1993, which is a continuation-in-part of Ser. No. 771,197, Oct. 4, 1991, Pat. No. 5,283,856.

[51] Int. Cl.$^6$ ..................................................... H04N 1/00
[52] U.S. Cl. .................................. 364/514 R; 358/402
[58] Field of Search .......................... 364/400, 514 R; 395/650, 909; 358/402, 403

[56] References Cited

U.S. PATENT DOCUMENTS

| | | | |
|---|---|---|---|
| 4,106,060 | 8/1978 | Chapman, Jr. ............................ | 358/256 |
| 4,532,588 | 7/1985 | Foster ........................................ | 395/650 |
| 4,558,413 | 12/1985 | Schmidt et al. ........................... | 364/300 |
| 4,646,235 | 2/1987 | Hirosawa et al. ......................... | 364/200 |
| 4,648,061 | 3/1987 | Foster ........................................ | 264/900 |
| 4,658,370 | 4/1987 | Erman et al. .............................. | 364/513 |
| 4,713,780 | 12/1987 | Schultz et al. ............................ | 364/514 |

(List continued on next page.)

OTHER PUBLICATIONS

Amadi, Dr. A.O., "Automatic Filing and Retrieval of Official Messages Using Global Mail Attributes and a Viewdata System with Symbolically Names Pages," *Office Information Systems*, Oct. 1988, pp. 11–18.

Crowston, K. and Malone, T.W., "Intelligent Software Agents," *Byte*, Dec. 1988, pp. 267–271.

Gold, E., "ETC: an AI Based Electronic Mailer," Research Notes, Computer Research Laboratory, Tektronix, Inc., P.O. Box 500, MS 50–662, Beaverton, OR 97077, Draft—Jun. 28, 1985, pp. 1–15 plus 10 pages consisting of References, List of Figures, and List of Tables.

Grief, I. and Sarin, S., "Data Sharing In Group Work," *Massachusetts Institute of Technology, Laboratory for Computer Science*, Oct. 1986, pp. 1–10. (Note: this paper was to have appeared in in Proceedings of Conference on Computer-Supported Cooperative Work, Dec. 3–5, 1986, Austin, Texas.)

Lai, K.Y., Malone, T.W., and Yu, K.C., "Object Lens: A 'Spreadsheet' for Cooperative Work," *ACM Transactions on Office Information Systems*, 1988, pp. 1–28 plus Figs. 1–11. (No Month).

Lee, J. and Malone, T.W., "Partially Shared Views: A Scheme for Communicating among Groups that Use Different Type Hierarchies," *ACM Transactions on Information Systems*, vol. 8, No. 1, Jan. 1990, pp. 1–26.

(List continued on next page.)

*Primary Examiner*—Emanuel T. Voeltz
*Assistant Examiner*—Thomas Peesu
*Attorney, Agent, or Firm*—Hale and Dorr

[57] ABSTRACT

A rule based electronic messaging system with a facility for automatically running a user's rules under system control without need for user intervention or attendance, having a feedback mechanism which reports status relating to users automatically processed. System status reporting or feedback can be used for workflow administration or routing. A controller utility accesses a user-list-file with the user name of every "user" whose messages are to be automatically, periodically processed. Upon accessing the user-list-file, a user name is selected and that user's copy of the mail messaging facility is started. The controller runs that user's rules against that user's messages and effects processing of the messages accordingly. Status information is reported and rules can be invoked as a function of the status reporting. A dedicated rule server can be implemented wherein the feedback information is used for work flow administration.

15 Claims, 23 Drawing Sheets

U.S. PATENT DOCUMENTS

| | | | |
|---|---|---|---|
| 4,713,837 | 12/1987 | Gordon | 379/93 |
| 4,730,259 | 3/1988 | Gallant | 364/513 |
| 4,734,931 | 3/1988 | Bourg et al. | 379/93 |
| 4,763,277 | 8/1988 | Ashford et al. | 364/513 |
| 4,768,144 | 8/1988 | Winter et al. | 364/200 |
| 4,805,207 | 2/1989 | McNutt et al. | 379/89 |
| 4,809,219 | 2/1989 | Ashford et al. | 364/900 |
| 4,827,418 | 5/1989 | Gerstenfeld | 364/439 |
| 4,831,526 | 5/1989 | Luchs et al. | 364/401 |
| 4,837,798 | 6/1989 | Cohen et al. | 379/88 |
| 4,849,878 | 7/1989 | Roy | 364/200 |
| 4,860,352 | 8/1989 | Laurance et al. | 380/23 |
| 4,866,634 | 9/1989 | Reboh et al. | 364/513 |
| 4,876,711 | 10/1989 | Curtin | 379/94 |
| 4,879,648 | 11/1989 | Cochran et al. | 364/300 |
| 4,884,217 | 11/1989 | Skeirik et al. | 364/513 |
| 4,890,240 | 12/1989 | Loeb et al. | 364/513 |
| 4,891,766 | 1/1990 | Derr et al. | 364/513 |
| 4,899,136 | 2/1990 | Beard et al. | 340/706 |
| 4,902,881 | 2/1990 | Janku | 235/381 |
| 4,912,648 | 3/1990 | Tyler | 364/513 |
| 4,914,590 | 4/1990 | Loatman et al. | 364/419 |
| 4,918,588 | 4/1990 | Barrett et al. | 364/200 |
| 4,924,408 | 5/1990 | Highland | 364/513 |
| 4,931,933 | 6/1990 | Chen et al. | 364/409 |
| 4,937,036 | 6/1990 | Beard et al. | 340/706 |
| 4,939,507 | 7/1990 | Beard et al. | 340/706 |
| 4,941,170 | 7/1990 | Herbst | 379/100 |
| 4,949,278 | 8/1990 | Davies et al. | 364/513 |
| 5,040,141 | 8/1991 | Yazima et al. | 364/400 |
| 5,063,523 | 11/1991 | Vrenjak | 364/514 |
| 5,103,498 | 4/1992 | Lanier et al. | 395/68 |
| 5,245,532 | 9/1993 | Mourier | 364/400 |

OTHER PUBLICATIONS

Mackay, W.E.; Gardner, B.R.; Mintz, T.H.; Pito, R.A.; and Siegal, J.B., "Argus Design Specification," Copyright 1989 Massachusetts Institute of Technology, Draft: 17 Oct. 1989, pp. 1–50.

Mackay, W.E.; Malone, T.W.; Crowston, K.; Rao, R.; Rosenblitt, D.; and Card, S.K., "How Do Experienced Information Lens Users Use Rules?" Copyright 1989 ACM (Association for Computing Machinery), CHI'89 Proceedings, May 1989, pp. 211–216.

Malone, T.W.; Grant, K.R.; Lai, K.Y.; Rao, R.; and Rosenblitt, D.A., "The Information Lens: An Intelligent System for Information, Sharing and Coordination," *Technological support for work group collarboration*, M.H. Olson (Ed.), Hillsdale, NJ: Lawrence Erlbaum Associates, 1989, pp. 65–88. (No Month).

Malone, T.W.; Grant, K.R.; Turbak, F.A.; Brobst, S.A.; and Cohen, M.D., "Intelligent Information–Sharing Systems," *Communications of the ACM*, May 1987, vol. 30, No. 5, pp. 390–402.

Malone, T.W.; Grant, K.R.; Lai, K.Y.; Rao, R.; and Rosenblitt, D., "Semistructured Messages Are Surprisingly Useful for Computer–Supported Coordination," Research Contributions, *ACM Transactions on Office Information Systems*, vol. 5, No. 2, Apr. 1987, pp. 115–131.

Marshak, D.S., "Filters: Separating the Wheat from the Chaff," *Patricia Seybold's Office Computing Report*, vol. 13, No. 11, Nov. 1990, pp. 1–8.

Pollock, S., "A Rule–Based Message Filtering System," *ACM Transactions on Office Information Systems*, vol. 6, No. 3, Jul. 1988, pp. 232–254.

Press releases, newspaper and magazine articles, and pre–publication research notes relating to Beyond, Inc., and BeyondMail, dated between Oct. 17, 1989, and Sep. 24, 1991, individually listed and identified as items #1 through #33 on cover sheet entitled "Appendix A."

Product brochure entitled "BEYONDMail Personal Productivity Tool," Copyright 1991 Beyond Incorporated, (no month) consisting of one two–sided page.

Product brochure entitled "BeyondMail Electronic Mail for Productive Workgroups," by Beyond Incorporated, consisting of cover page and 6 pages of information (undated).

Putz, S., "Babar: An Electronic Mail Database," Copyright 1988 Xerox Corporation, Palo Alto, Calfornia, Xerox Parc, SSL–88–1, Apr. 1988, pp. 1–17, with attached Babar User Guide, pp. 1–30.

Rosenberg, J., Everhart, C.F., and Borenstein, N.S., "An Overview of the Andrew Message System," Jul. 1987, Copyright 1988 ACM 0–89791–245=4/88/0001/0099, pp. 99–108.

Perkins, W.A., "Adding Temporal Reasoning to Expert–System–Building Environments" Copyright 1990 IEEE Expert, Feb., 1990, pp. 23–30.

Dutta, S. "An Event Based Fuzzy Temporal Logic" Copyright 1988 IEEE pp. 64–71.

Arcidiacono, T. "Expert System On–call", Copyright 1988, PC Tech Journal, Nov. 1988, pp. 112–135.

Fischer International Systems Corporation, "WorkFlow.2000 The Business Tool for $Emc^2$/TAO", Copyright 1992.

Shark!BYTES, "Shark!mail 2.0 Workflow as Nature Intended", LANshark Systems Newsletter, vol. 3, Issue 1, Copyright Apr., 1993.

Fischer International Systems Corporation, "WorkFlow.2000 The Business Tool for OfficeVision", Copyright 1992.

Fischer International Systems Corporation, "$Emc^2$/TAO Electronic Mail Communication Center", Copyright 1990.

Fischer International Systems Corporation, "$Emc^2$/TAO LAN Electronic Mail/Office Automation for the LAN".

Press Release Article of WorkFlow.2000 by Fischer International Systems Corporation. No Date.

TICKLE STRUCTURED EDITOR

WHILE I'M OUT

WHEN NEW: REQUEST FORM

FROM: TJONES, MGOLD, SALESMGRS

SUBJECT CONTAINS:

☒ IF SENT DIRECTLY TO ME   ☐ IF URGENT

---
MESSAGE ACTION

☒ REPLY   TO SENDER

☒ FORWARD TO: LWHITE

USING TEXT: I'M OUT OF THE OFFICE UNTIL JUNE 1. SEE LARRY WHITE IF YOU NEED SOMETHING IMMEDIATELY.

☒ RESEND TO: JSMITH@ROADPC

☒ MOVE TO FOLDER: NEW REQUESTS

---

OK    NEW FOLDER    CANCEL    HELP

```
BEYOND EDIT RULE                                      11:31 AM
  RULE NAME: INCOMING STATUS REPORTS            RULE EDITOR
   WHEN
  NEW   ↓(ANY TYPE)   ↓  MESSAGE IN      INBOX      FOLDER
   IF
          TO:
        FROM: EFLYNN, SADAMS, KBLACK, MGOLD
          CC:
         BCC:
     SUBJECT: STATUS, WEEKLY REPORT
  ATTACHMENT:
         DATE:

TEXT:
  ( ) RECEIPT REQUESTED  PRIORITY:    ↓  ( ) KEEP COPY IN:    ↓
   THEN
  MOVE MESSAGE TO "STATUS REPORTS"  ↓FOLDER:

OPEN RULE SET: STANDARD
FORM
```

FIG. 12A

```
BEYOND EDIT RULE                                       9:50 AM
  RULE NAME: INCOMING STATUS REPORTS            RULE EDITOR
   WHEN
  NEW  ↓(ANY TYPE)  ↓  MESSAGE IN      INBOX      FOLDER
   IF
  [(FROM) IN "EFLYNN" OR (FROM) IN "SADAMS" OR (FROM) IN "KBLACK" OR
   (FROM) IN "MGOLD"] AND [(SUBJECT) MATCHES "STATUS" OR (SUBJECT)
   MATCHES "WEEKLY REPORT"]

THEN
  MOVE MESSAGE TO "STATUS REPORTS"  ↓ FOLDER;

OPEN RULE SET: STANDARD
TEXT
```

FIG. 12B

AUTOMATIC ELECTRONIC MESSAGING SYSTEM WITH FEEDBACK AND WORK FLOW ADMINISTRATION

RELATED APPLICATION

This application is a continuation-in-part of application Ser. No. 08/011,346, filed Jan. 29, 1993, which is a continuation-in-part of application Ser. No. 07/771,197, filed Oct. 4, 1991, now U.S. Pat. No. 5,283,856.

FIELD OF THE INVENTION

The present invention relates to an electronic mail messaging system and in particular to a rule based system and rule server for manipulating messages in the electronic mail messaging system.

BACKGROUND OF THE INVENTION

Rule-based systems are known which use rules, typically "If-Then" sequences, to automatically process or "filter" signal groups transmitted as messages in a computer environment or network. Such systems are generally implemented in the context of electronic mail facilities. The application of rules or the occurrence of an action is triggered upon selected criteria being met. Upon the occurrence of a received and stored mail message satisfying specified conditional criteria set forth in the "If" portion of the statement, such as the mail message being addressed from a selected addressor, the "THEN" portion of the rule or rule set will invoke some action, in some instances directing signal groups comprising the mail message to a designated file or user area. In known systems, the "If-Then" sequences can be constructed using connectors and Boolean operators resulting in relatively complex combinations within and among fields of the sequence.

In one system (ISCREEN), described in *A Rule-Based Message Filtering System* by Stephen Pollock published in ACM Transactions on Office Information Systems, Vol. 6, No. 3, July 1988, pages 232–254, electronic text mail messages are screened, decisions are made and actions taken in accordance with rules defining procedures typically implemented as part of the manual processing of information generated in an office. A user invokes a rule editor to create rules for providing instructions to the system. The rules include conditions which describe values associated with attributes of a mail message, such as who the mail message is from and/or what it is about. The rules created by the user further include actions which describe what is to be done with mail messages that match the user specified conditions. Typical actions, which in this known implementation are functions of the underlying mail messaging system, include forwarding, filing and deleting the mail message(s).

A special purpose editor invoked by the user to define rules, disadvantageously requires that a specific rule format be learned and adhered to by the user. Specified rules can only be triggered on matching mail message criteria and cannot be triggered based upon the occurrence of an event, such as the expiration of a time interval. Further, the system requires extensive parsing of user-specified instructions to detect instruction conflicts, completeness and consistency.

Another known system (Object Lens), disclosed in *Object Lens: A 'Spreadsheet' for Cooperative Work*, by Kum-Yew Lai et al published in ACM Transactions on Office Information Systems, 1988, provides various templates for various semi-structured objects which users define and modify to represent information about, among other things, people, tasks, products, and mail messages. Users can create displays to summarize selected information from the semi-structured objects in table or tree formats. A template-based user interface, permits users to interface with an object-oriented data base to see and change objects via interaction with familiar forms or templates. The user, via the templates, constructs conditional rules comprising "If" conditions, which upon satisfaction "Then" result in user-specified actions taking place in accordance with the specified rule(s). The "If-Then" rules can be used to group objects together and can be automatically invoked as "semi-autonomous agents" or methods invoked by the system without user intervention, specified by the user to process information in different ways. Users can create these rule-based agents to be triggered upon the condition of an occurrence, in particular upon receipt of a new mail message. Upon the "If" portion of the rule being satisfied, a further set of rules is applied to a specified collection of objects, semi-autonomously (i.e., automatically but under control by a human user).

However, limited flexibility is provided by this system which only tests occurrences as a conditional ("If") component of a rule. Considerable complexity and inefficiency is also inherent in the system which requires compound conditions ("Ifs") for event triggering, because in addition to every mail message being tested for an occurrence or event which satisfies a first rule, the mail messages must be further tested for other criteria to be satisfied before invoking the action ("Then") portion of the rule.

In addition to having limited event driven capability that results in inflexible and inefficient processing of mail messages, and requiring a user to learn fairly complex rule design and construction schemes, known systems do not have a capability to invoke or "launch" known applications via an event selective rule mechanism.

Typically, in known messaging systems the execution of rules and processing of incoming messages requires that the user be logged on and running the particular mail messaging system. Processing of incoming messages, e.g. storing and/or forwarding, is performed in accordance with rules generated by the user and run in a manner requiring some nominal level of presence or interaction of the user, e.g., the user or someone else must have logged the user onto the mail messaging system and must keep the mail system up and running. However, some systems are known which permit unattended scheduling of message processing. For instance, various versions of the UNIX operating system have mail messaging facilities for scheduling automatic message processing at periodic intervals. A system program (known as "atrun" in some versions of UNIX), effects the processing of messages at periodic intervals eliminating the need for the nominal level of user presence. A system administrator, in configuring the operating system, determines the intervals or periods between the automatic processing of messages. The system processes the user's stored incoming messages in accordance with system requirements, without attendance of the user.

Known systems for the periodic processing of electronic messages without user attendance/interaction suffer a significant limitation in that there is no system follow-up subsequent to automatic periodic message processing. The messages are just queued and processed upon the availability of system resources. Typically, the user must follow-up, or take for granted, that the messages were automatically processed as specified. No reporting or feedback is facilitated to indicate that the message processing scheduled has been effected. Known systems lack any capability to follow-up automated execution of message processing via rules, with consequent activity in accordance therewith. That is, the known systems do not provide feedback relating to the automatic processing of messages and cannot effect other actions based upon the automated processing of messages.

SUMMARY OF THE INVENTION

The present invention provides a flexible, efficient, event-driven and conditional rule-based system which can be transparently implemented for use, e.g. in electronic mail applications. A rule mechanism is implemented having a "When-If-Then" event-driven, conditional, action-invoking paradigm or "triplet" which facilitates definition of a repertoire of events considered to be significant events upon which to trigger actions in a system such as an electronic mail messaging system. Particular events may be associated with a specific mail message, and/or rule(s), to promote efficient mapping of messages, events, and rules, so that only rules which monitor a specific event are invoked upon occurrence of the event. Thus, only mail messages and relevant rules (i.e., those having an associated satisfied event) need be further processed.

Further, a graphical interface is presented to the user to permit "point and click" or cursor controlled synthesis or design and invocation of underlying structured rule editors or rule set(s), via a substantially user transparent rule mechanism. The user can invoke structured rules and rule sets without learning a complex rule language and editor. Such structured rule editors can be implemented according to an extensible and portable architecture that permits rule synthesis in mail messaging environments wherein the underlying rule scripting language is transparent to the user.

Still further, the rule mechanism has a capability to permit a user to invoke or "launch" a concurrent process or application from within the event selective rule mechanism. The action or THEN portion of a rule can specify a launch verb which provides a springboard to off-the-shelf application software, such as a spreadsheet program, word processor or the like, permitting the user to launch automatically into the application via the rule mechanism and to automatically re-enter the messaging system from the launched application.

The present invention further provides an electronic messaging system with a facility for automatically running a user's rules under system control without need for user intervention or attendance, and provides a feedback mechanism reporting status relating to users automatically processed. System status reporting or feedback can be used for follow-up activity, such as workflow administration or routing.

A controller is provided which accesses a user-list-file with the user name of every "user" whose messages are to be automatically, periodically processed. "Users" can be actual users (i.e. real people), or virtual users (i.e. message enabled applications). Upon accessing the user-list-file, a user name is selected and that user's copy of the mail messaging facility is started. The controller runs that user's rules. The status of the controller utility is reported to a log file and via a user interface indicating, among other things, the name of the user whose in-box is being processed. The number of users that have been processed is reported. Additional status information can be reported and rules can be invoked as a function of the status reporting. When the controller utility processes the last user in the user-list-file, it returns to where it began in the list and starts the processing over. The controller utility can be implemented at any of various user's workstations having network and messaging system capabilities, or it can be implemented on a dedicated workstation functioning as a rule server.

In one embodiment, the status report or feedback is provided in the form of a user interface or display window and is written to a persistent log file that is useful for maintaining an audit trail.

In another embodiment, wherein the controller utility is implemented on a dedicated workstation functioning as a rule server (having rule and messaging system capabilities), the feedback information can be used for work flow administration, allocating work or tasks in accordance with rules or applications. The work or tasks are allocated, in accordance with rules or applications, among different queues. Work flow or task allocation amongst the different queues is dependent upon where bottlenecks and resource constraints occur and is dynamic as work loads and priorities change. The system according to the invention can be implemented as a network operating system add-in.

Features of the invention include a simple user interface to an efficient, powerful and sophisticated rule based messaging system. While simple user interfaces are available which synthesize rules via the underlying structured rule editor, extensive rule syntax permits external text editors to be used to create interfaces for importation into the system. A customizable icon bar provides shortcuts for configuring the rule mechanism and effects the firing or invocation of a rule via the user interfacing with the icon bar.

Economies and efficiencies are gained by having user's messages processed without having to have multiple copies of a mail messaging system up and running on separate workstations. Such economies and efficiencies include rule/message processing for users and virtual users without expenditures for hardware dedicated to each user. In the standalone rule server embodiment, a centralized, user transparent facility is provided for processing rules and running message enabled applications virtually without any user intervention freeing users to perform other tasks. Rules can be centralized on a database through the standalone rule server, for availability to numerous real and virtual users that are clients of the rule server. Network and system services are consumed by a single/centralized processor as opposed to a plurality of processors competing for network and system resources. The function of adding or deleting a user's name from the user-list-file can be automated and handled by the rule server upon receipt of a message from the user to add or delete the user's name from the user-list-file.

Other aspects of the messaging system according to the invention are explained in BEYONDMAIL Electronic Mail for Productive Workgroups: Rule Book; User Guide; and Administration Guide, and BeyondMail for Windows Release 1.0/MHS: Rule Book; User Guide; Administration Guide, and BeyondMail Forms Designer, which are incorporated herein by reference.

DESCRIPTION OF THE DRAWING

These and other features and advantages of the present invention will become more apparent in light of the following detailed description of an illustrative embodiment thereof, as illustrated in the accompanying drawing of which:

FIGS. 12a and 12b are illustrations of form mode and text mode formats for creating rules, respectively;

DETAILED DESCRIPTION

Figure 1:
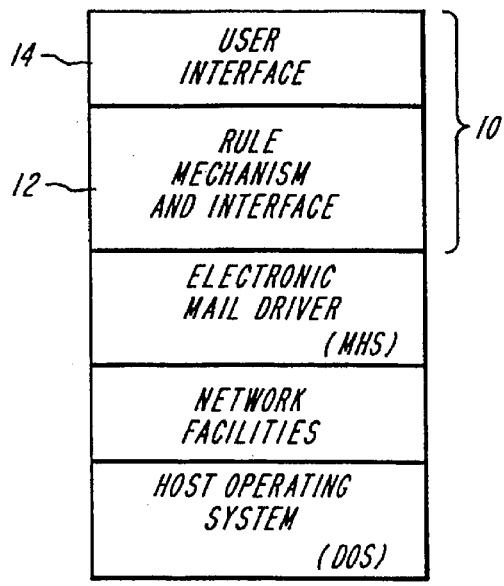
FIG. 1 is a simplified block diagram of components of a rule based message handling system.

A rule based messaging system, as illustrated in FIG. 1, is implemented in computer based systems and typically in networked personal computer systems. The personal computer system, such as an IBM PC or other computer, includes an operating system, such as Novell Netware and/or Microsoft Windows, upon which an electronic mail protocol such as MHS is installed to facilitate mail message processing among computers connected via the network facilities. A rule based messaging mechanism 10, comprises a rule mechanism and interface 12 to the electronic mail driver. The rule based messaging mechanism 10 is accessible to a user through a user interface 14, such as templates as known in the art or through a graphical user interface as described hereinafter.

Figure 2:
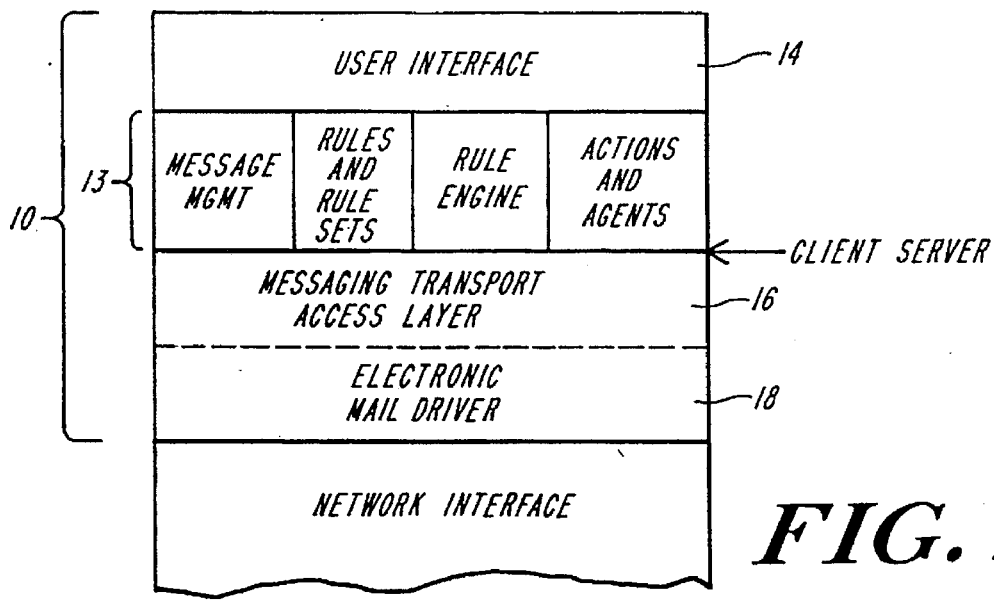
FIG. 2 is a diagrammatic representation of a client-server implementation of the rule based message handling system of FIG. 1.

In one embodiment, as illustrated in FIG. 2, a client-server architecture is implemented. Various rule mechanism resources 13 and the user interface 14 are served by a messaging transport access layer 16. In conjunction with an integral electronic mail driver component 18 available to the rule based messaging mechanism 10, the message transport access layer 16 serves as an application program interface which integrates the rule mechanism 10 with the particular electronic mail application running with the network software, facilitating mail message access between the rule mechanism resources 13 and the electronic mail application.

The rule mechanism resources 13 implement actions on a mail message (i.e. cause something to be done) based upon an evaluation of a condition, effected upon the occurrence of a particular event. The structure of every rule, whether user specified or invoked under a graphical user interface, can be diagrammed as:

WHEN(event)——>IF(condition)——>THEN(action).

The WHEN event field permits specification of classes of occurrences and/or various types of mail messages which will invoke the rule segment defined in the corresponding IF(condition)——>THEN(action) fields of a specified rule. Events trigger the processing of conditions and actions and enable efficient mapping of messages, events and rules.

The events may be a function of a timer integral with the system, or a function of a folder destination of a particular message, or a function of the form of a mail message according to the mail messaging system. Additionally, events may be any of various occurrences of a user interacting with a user interface, such as manually clicking a mouse on a portion of a graphical interface, or dragging and dropping an icon on a drop well portion of a graphical interface, or the like. Various and numerous events as discussed hereinafter, can be specified to trigger evaluation of a condition and invocation of corresponding action(s). Preferably event types will accommodate respective operands to permit further specification of relevant messages to be considered for rule invocation, to further enhance the efficiency of the rule mechanism. Event types, described hereinafter, are created and processed by an event manager using a common set of data structures and routines.

Figure 3A:
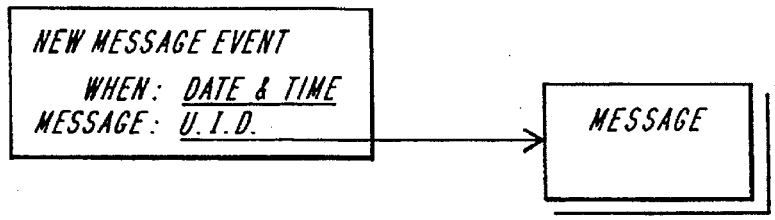
FIGS. 3a–3h are illustrations of data structures for implementing an event component of a rule in the rule based messaging system of FIG. 1.

A NEW message event type (WHEN NEW), is used to specify application of rules to a new message which has been received by the electronic mail application over a network mail transport agent (MTA) and placed in a message store. Upon receipt of a message packet from the MTA over the network interface (i.e. a NEW message), a NEW message event is created by the event manager, according to a data structure illustrated in FIG. 3a. The NEW message event is created indicating the date and time of receipt of the new message. A message identifier or unique identifier (UID) is included in the NEW event to point to the message (which may be stored using the host operating system filing facilities) associated with the NEW message event. The NEW message event is stored to an event queue to be processed as discussed hereinafter.

Upon specification for rule invocation, the NEW event can be further limited by including operands which specify a particular kind or FORM of message for application of the corresponding rule. The ultimate functionality is that a rule is triggered upon receipt of a message of a particular FORM in an Inbox or other new message initial repository.

Figure 3B:
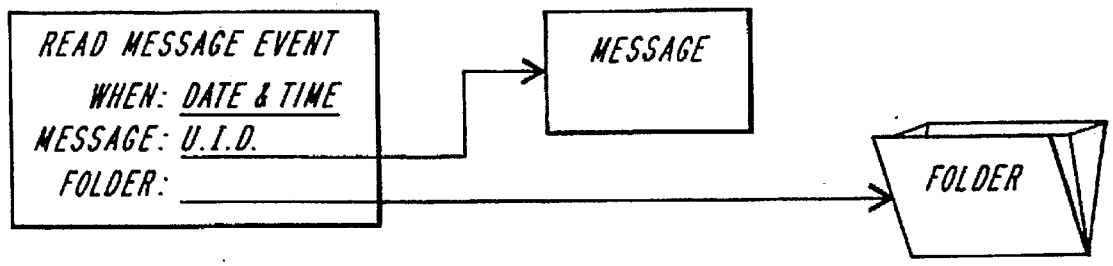

A rule can be triggered in accordance with the event portion of the rule mechanism, when a message has been read for the first time, by specifying a WHEN READ event as a limitation of a rules evaluation and application. A READ message event is created according to the data structure illustrated in FIG. 3b. In addition to the date and time when the message was first read, the READ message event is created by the event manager to have a unique identifier for the associated message. The UID includes specification of a folder, as the message may have been moved previously and reside in a folder other than the Inbox. A WHEN READ limited rule can also be further limited by specification of operands to limit the FORM of the message to which the rule is applied and to limit the application of the rule to messages in a particular FOLDER.

Figure 3C:
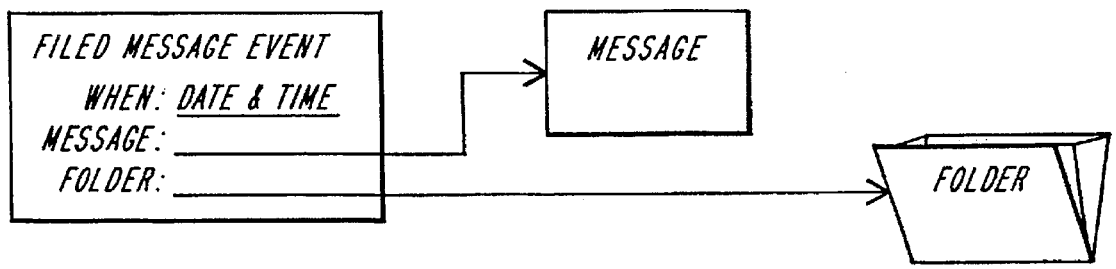

Similarly, a rule can be triggered upon a message being FILED, according to a FILED message event having an associated data structure as illustrated in FIG. 3c, which is substantially the same as the data structure for the READ message event. Optionally, as with the hereinbefore described WHEN NEW and WHEN READ limitations, the WHEN FILED rule can be limited for application to a message of a particular FORM and/or destined for a particular FOLDER.

Rule application limiting message kinds, i.e. FORMs of messages, which can be used to further limit the application of rules when the event occurrence specified is NEW, READ or FILED, are limited by the repertoire of forms (and folders) available in the messaging system. In the present illustrative embodiment, the WHEN NEW, READ and FILED event limitations can be further limited, to limit application of rules to message kinds of a FORM supported by conformance to the illustrative MHS system protocol and/or those provided for in the present mail messaging application. Message forms, which are extensible and which can be specified for further limitation of the invocation of corresponding rules include: memo, phone message, reply and request form, among others. Default settings can be established for limitations on events so that operands need not be specified.

Figure 3D:
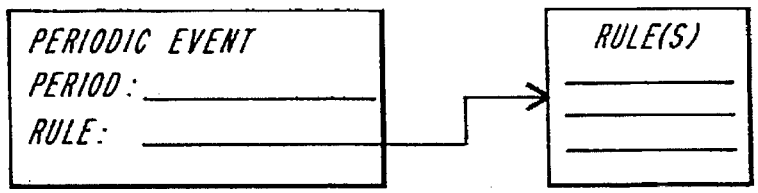

Timed events can be used to trigger a rule or rules limiting invocation of the rule mechanism. A timer is integrated with the present rule based messaging system and used to implement PERIODIC rules. Periodic occurrence triggers corresponding rules every passage of a specified number of minutes/hours/days/weeks/months, as specified in the event portion of the rule. A PERIODIC event data structure, illustrated in FIG. 3d, does not point to a message, but has a rule pointer or tag which points to a rule in a rule data base for invocation of an action or sequence of actions. The periodic occurrence is limited to a specified time period by providing a PERIOD operand, which specifies the time basis upon which the event occurs.

Figure 3E:

A TIMER event is defined in a data structure as illustrated in FIG. 3e which includes a date and time when the event is to get noticed. A UID identifies a message associated with the event and a rule pointer points to a rule in the rule data base which contains an action or sequence of actions to be taken with respect to the message, on a one time basis when the specified date and time occurs.

A TICKLER event can be implemented in the present rule based messaging system in a manner similar to TIMER events. For example, the system can be instructed, upon the occurrence of the TICKLER event, to move a message to a "today" folder on a specific date and to "tickle" the user as to the significance of the message. The tickler data structure, illustrated in FIG. 8 and described more fully with respect to system architecture hereinafter, includes a unique identifier of a message which is associated with the TICKLER event. Additionally, the tickler data structure includes a pointer to a rule or rule sets having conditions which are tested and actions that are executed upon processing of the event and satisfaction of the conditions.

Figure 3F:
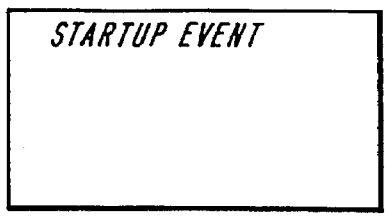
Figure 3G:

Messaging system application start-up and exiting can be specified as events to trigger rules, in accordance with data structures illustrated in FIGS. 3f and 3g. STARTUP and EXITING events are only initiated upon an event queue search at the respective occurrence. Neither occurrence requires nor permits the specification of an operand. The STARTUP event is queued and invokes corresponding rules when the messaging system processes the in-queue STARTUP event at messaging system application start-up. Similarly, the EXITING event causes rules, which match the event type, to be invoked when the messaging system is being exited.

Figure 3H:
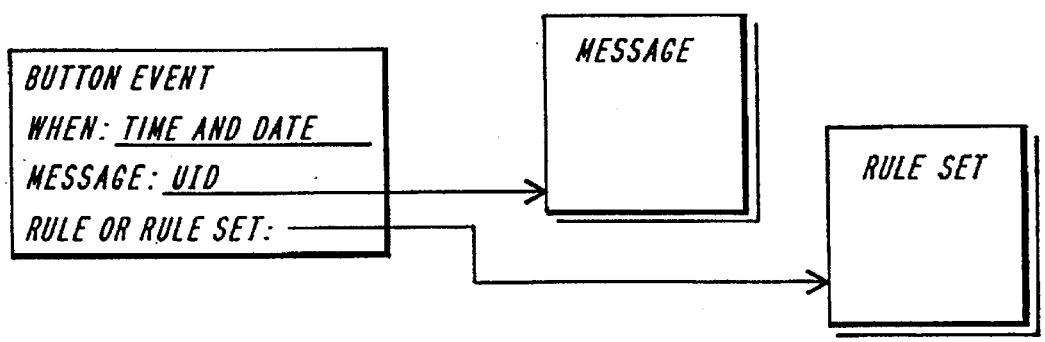

An event called a "BUTTON" event is created and queued upon sensing user interface actions, such as mouse pointing and clicking. A BUTTON event type, having a data structure as illustrated in FIG. 3h, includes an event time and date field which specifies when a user interface management system, as known in the art, sensed the event occurrence, i.e the clicking on a button within a portion of a graphical user interface (form) or screen that is representative of a message. The data structure includes a unique identifier (UID) pointing to the message associated with the form or interface containing the button which was affected. A pointer is associated with the button, that points to a rule or rule set in a rule database which contains the conditional(s) tested and action(s) executed upon occurrence of the associated BUTTON event.

Figure 3I:
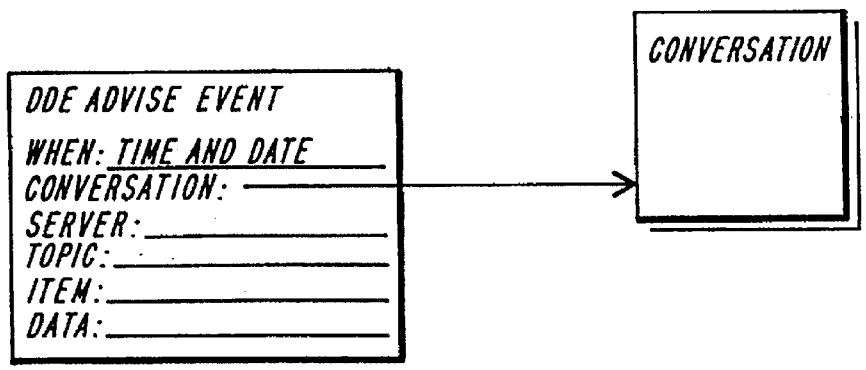
FIGS. 3i is an illustration of a Dynamic Data Exchange (DDE) event data structure.

Events, according to the present invention, can be implemented to invoke IF——>THEN sequences upon external occurrences. As illustrated in FIG. 3i, an event can be synthesized based on inter-application communication (IAC). Facilities are known, such as Microsoft's Windows Dynamic Data Exchange (DDE) described in Microsoft WINDOWS SOFTWARE DEVELOPMENT KIT Guide to Programming For the Microsoft Windows Operating System, published by Microsoft Corporation which is incorporated herein by reference, which permit the exchange of data between disparate applications programs. The mail messaging system can act as a client application and exchange data or parameters with a DDE server application, as described in the referenced Guide for Programming. The two applications, one of which is the mail messaging system according to the invention, involved in dynamic data exchange, are engaged in a "DDE conversation".

An event synthesizer component of the event manager described hereinafter, responsive to a DDE cooperating application, creates a DDE Advise event according to the data structure illustrated in FIG. 3i. The data structure of the DDE Advise event includes a time and date field that indicates when the event data structure is synthesized upon the mail messaging system according to the invention becoming a client of, i.e. initiating the cooperating DDE server application in a conversation. The data structure includes a conversation field which points to or identifies a DDE conversation with the DDE server application. Server or application, topic, and item fields further identify the conversation between the client and server. The client and server exchange parameters or data which are pointed to by a data field of the DDE Advise event data structure. The data or parameters exchanged are a function of the nature of the server application with which the mail messaging system is in conversation. The DDE Advise event synthesized is processed by the event manager with other events as discussed hereinafter. Associated rule(s) or rule sets in the rule data base invoke action(s) upon the occurrence of the DDE Advise event being processed and satisfying specified conditional criteria.

Figure 3J:
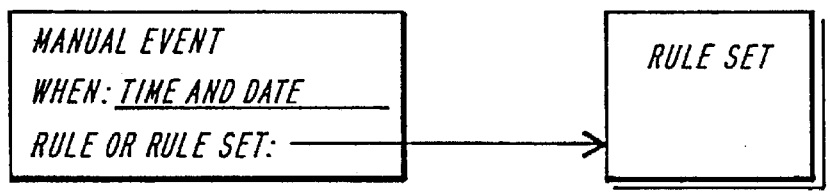
FIGS. 3j and 3k are illustrations of data structures for implementing manual and dropped event components of a rule, respectively.
Figure 3K:
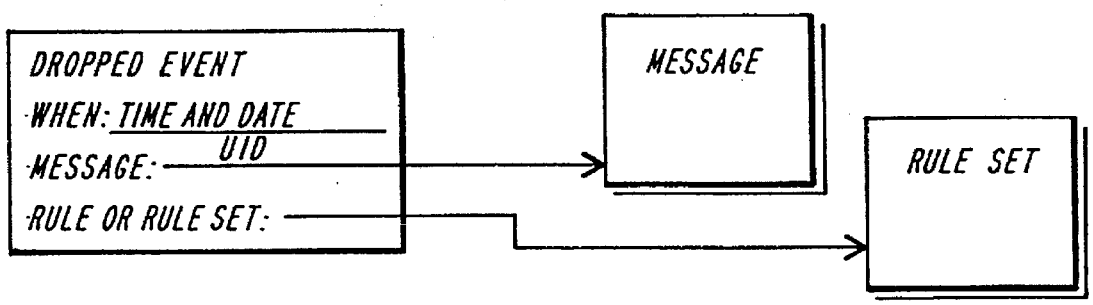

MANUAL and DROPPED events, data structures of which are illustrated in FIGS. 3j and 3k, respectively, provide event mechanism facilities for effecting occurrences to trigger rules by "manually" selecting rule(s) or rule set(s) to fire, and/or dragging and dropping icons to fire rules or rule sets, respectively.

The MANUAL event, similar to a button event described hereinbefore, effects an event facility for firing a rule, i.e. testing conditions and invoking associated actions upon satisfaction thereof, by clicking or pushing a button to enable interact with the event mechanism. The MANUAL event data structure (FIG. 3j) includes a field for the time and date when the event occurred, and a pointer to a rule or rule sets including conditions to be tested and actions to be invoked as a result of the occurrence of the event and satisfaction of the condition(s). Unlike the BUTTON event, the MANUAL event data structure does not identify an associated message, as the manual event occurrence is not necessarily a function of message activity.

DROPPED event occurrence, on the other hand, results upon the dragging and dropping of a message icon onto/into a drop well. Thus, the DROPPED event data structure (FIG. 3k), in addition to having a field including the time and date of occurrence of the event, comprises a unique identifier field for the message representation, e.g. icon, that was dragged and dropped to effect the event. Upon dropping the associated message icon in the drop well, a DROPPED event is created by the event manager and queued as discussed hereinafter. Upon processing the DROPPED event, associated conditions are tested and actions taken, if the conditions are satisfied, in accordance with rule(s) or rule set(s) specified and pointed to in the data structure thereof.

MANUAL and DROPPED events permit firing of rules from an icon bar of a graphical user interface that is customizable as described in the referenced mail messaging system documentation. The customizable icon bar can include buttons for effecting MANUAL events and drop wells for effecting DROPPED events. A user can interact with the icon bar to pick up icons to drag and drop to facilitate occurrence of events, or interact with a button to facilitate events, invoking conditions and actions. For instance, messages and folders containing messages can be dropped into rule drop wells to fire rules associated with the messages.

Figure 4:
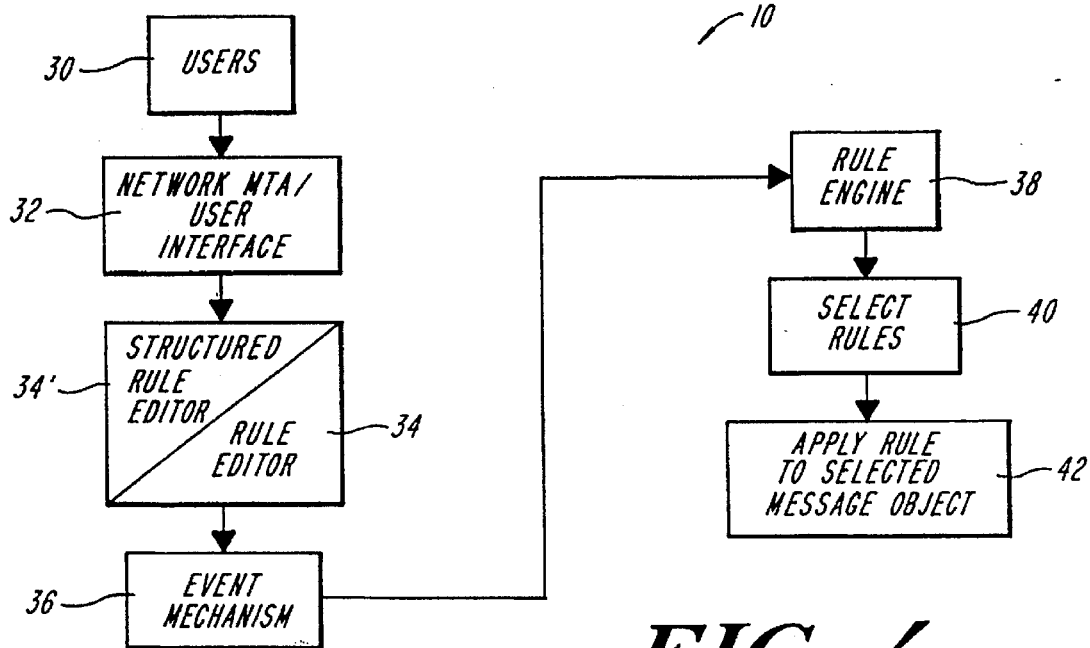
FIG. 4 is a diagrammatic representation of an event selective rule mechanism of the message handling system of FIG. 1.

The present messaging system, illustrated in FIG. 4, permits users 30 accessing the messaging application 10 through a network mail transport agent or a user interface(s) 32 to use a rule editor 34 or structured rule editor 34' (discussed hereinafter), to invoke the event mechanism 36 which facilitates efficient mapping of messages, events and rules and assures that only relevant rules and associated messages are further processed by a rule engine 38. Selected rules 40 are then applied to selected message objects 42 to quickly and efficiently control the flow of information for the user of the mail messaging application.

Figure 5:
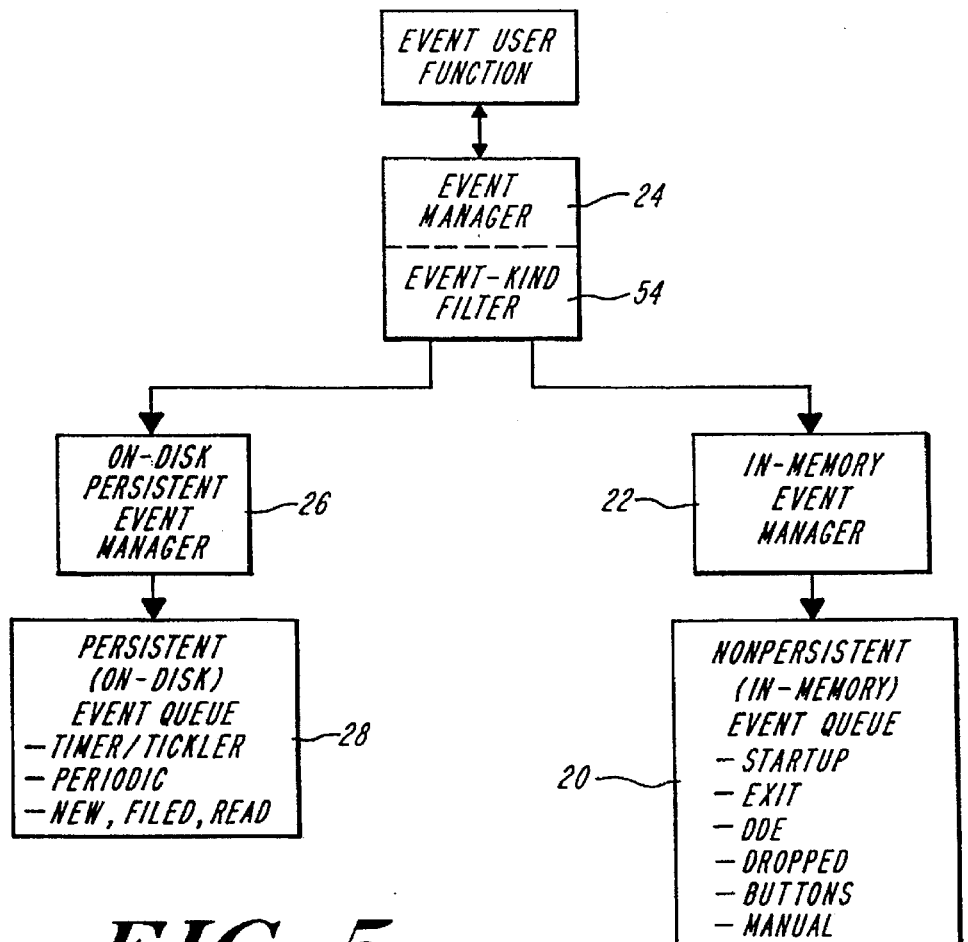
FIG. 5 is a block diagram of the event mechanism of the rule based message handling system of FIG. 1.

The event mechanism, illustrated in FIG. 5, facilitates the flexible selectivity and efficient processing of rules. The event mechanism comprises an event manager 24 which provides an application program interface for producing and storing events in accordance with the data structures discussed hereinbefore. The events described consist of two basic types, persistent and non-persistent events. Certain event kinds, including STARTUP, EXITING, DDE ADVISE, BUTTON, MANUAL and DROPPED events, are short lived non-persistent events which will not persist across instances of messaging system application execution. Non-persistent events are implemented using a memory based technique, as illustrated in FIG. 5, in which a queue of event records 20 is maintained in memory via an in-memory event manager 22 component of the event manager 24. The non-persistent event records are fetched from and posted to the non-persistent queue 20. The in-memory event manager 22 management of the non-persistent queue assures that the in-memory non-persistent queue 20 can grow and shrink as needed.

Persistent events, such as FILED, READ, NEW, PERIODIC, and TIMER events, which are likely to persist across messaging system application invocations, require a separate storage mechanism. Persistent events are stored in a persistent event queue 28 preferably maintained on disk which is accessed only by a persistent event manager 26 component of the event manager 24.

Figures 6, 7:
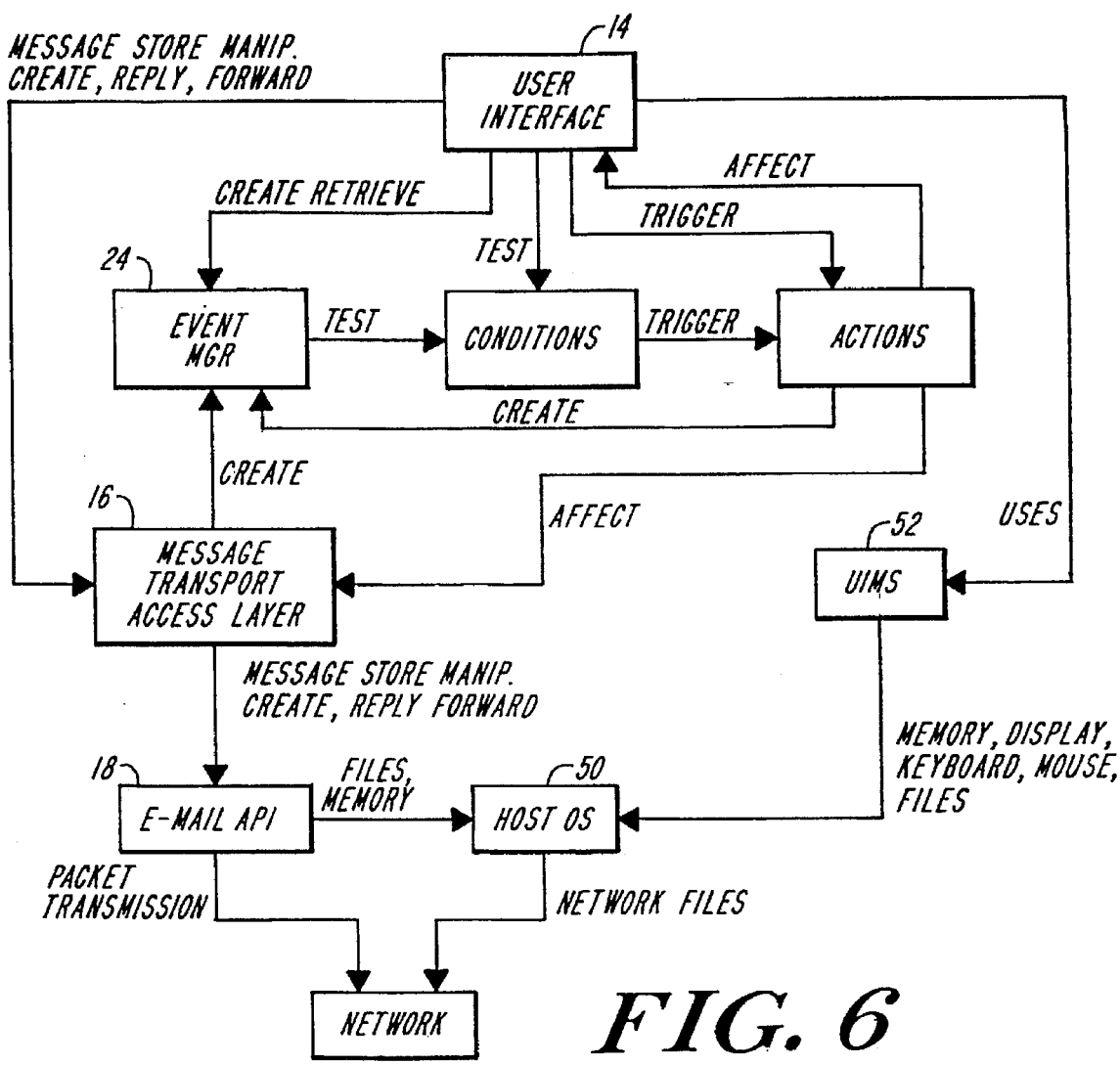
FIG. 6 is a system overview block diagram of the rule based message handling system of FIG. 1.
FIG. 7 is a graphic user interface for a tickle feature implementing a structured rule editor.

Event users or clients, such as the messaging transport access layer 16 invoking the event manager 24 via a NEW message event or such as the user interface invoking the event manager 24 via a STARTUP or EXITING event, call the event manager 24 to create events and to fetch events in the system as illustrated in the system overview of FIG. 6. The event manager 24 centralizes policy effecting event creation, consumption and storage, while minimizing the burden placed on clients.

When a new message packet is received over a network at a host having the mail messaging system according to the invention, the network informs the electronic mail application program interface (e-mail API) 18 that there is a packet of information. The e-mail API informs the messaging transport access layer 16 that there is a packet of information comprising a message. The messaging transport access layer 16 receives the information and stores the message, via the host operating system 50, as a file in a message store using the file services of the host. The message access transport layer 16 also calls the event manager 24 which creates a NEW message event in accordance with the data structure discussed hereinbefore, having the date and time received and a UID identifying the message stored. The event manager 24 invokes the persistent event manager 26 which stores the created NEW message event in the persistent event queue 28 for processing by the event manager substantially on a first-in first-out basis.

Other persistent events, i.e. FILED, READ, PERIODIC and BUTTONS, are similarly created and queued via the event manager 24 and persistent event manager 26, to be pulled off the first-in first-out persistent event queue 28 and processed. However, in these cases the user interface 14 is the client of the event manager 24. The user interface 14, in conjunction with a user interface management system 52

(UIMS) as known in the art, monitors occurrences such as the keystrokes or buttons indicative of filing, reading or otherwise manipulating a message, and invokes the event manager 24 and persistent and non-persistent event managers 22, 26 accordingly.

In the case of the user interface 14 invoking the event manager 24 to create a non-persistent event, such as STARTUP or EXITING event, the in-memory event manager 22 is invoked which maintains an in-memory first-in, first-out non-persistent event queue 20. Created events are added at the first-in end of the queue 20 and existing events being processed by the event manager 24 are fetched from the first-out end of the queue 20.

The event manager 24 interfaces with the rest of the system and initializes the in-memory (non-persistent) event queue 20, locates and opens the disk based persistent event queue 28 and synchronizes the non-persistent and persistent queues, effectively merging the queues. The event manager 24 centralizes event policies and transparently implements event prioritization. When an event record is fetched by the event manager 24 for processing, the events are fetched from the queues in accordance with a fixed prioritization, subject to an event-kind filter 54. The event record, used for both posting and fetching events from the queue, comprises various fields including bits indicative of event kind, date/time when the event was posted, type of object for which the event was created and a variant field permitting a memory based non-persistent event to hold a handle to an appropriate object or permitting a disk based persistent event to hold an identifier for an object, e.g. a message in the message store maintained in host memory. The event-kind filter 54 effects an event or bit mask which permits the event manager 24 to fetch events of a certain kind from the queues, limiting the kind of events sought and processed.

Events are fetched from the queue(s) using a priority scheme. Among the events enabled by the event mask (event-kind filter), the oldest event of the highest priority is returned to the event manager for processing first. Highest priority is given to STARTUP and EXITING events, while lesser priority is given the persistent events.

As indicated and illustrated hereinbefore, the ultimate functionality of the WHEN——>IF——>THEN rule based application is that: under the control of the user interface 14, the occurrence of events causes selected conditions to be tested; when satisfied, the conditions cause actions to be taken; and actions in turn may lead to the occurrence of new events. Little or no understanding of the rule mechanism and its rule language is needed by the ultimate user where a structured rule editor is designed and implemented through a graphical user interface. Structured rule editors are designed and implemented by a designer or programmer familiar with a WHEN——>IF——>THEN associated rule syntax. The structured rule editor implements rules so that the rule syntax and constructs are not presented to the user (i.e. the rule language, and editor, is transparent to the ultimate user), but appear to be embedded in the system beneath the graphical user interface which affects them. Thus, a higher level abstraction is facilitated wherein interactions with a graphical user interface are translated into a scripting language of a rule mechanism.

Figure 8:
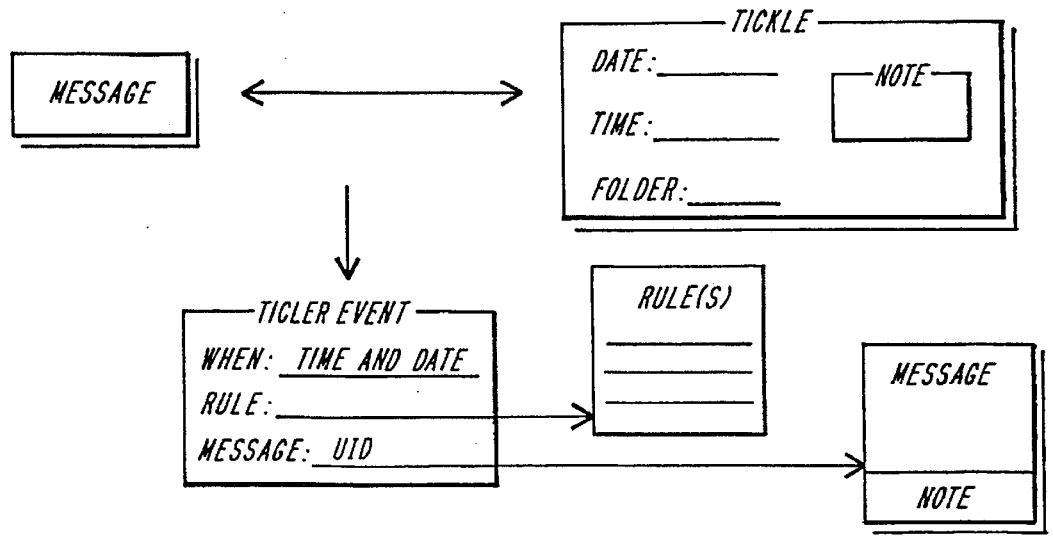
FIG. 8 is a diagrammatic representation of a tickler graphical user interface and associated event data structure.
Figure 9:
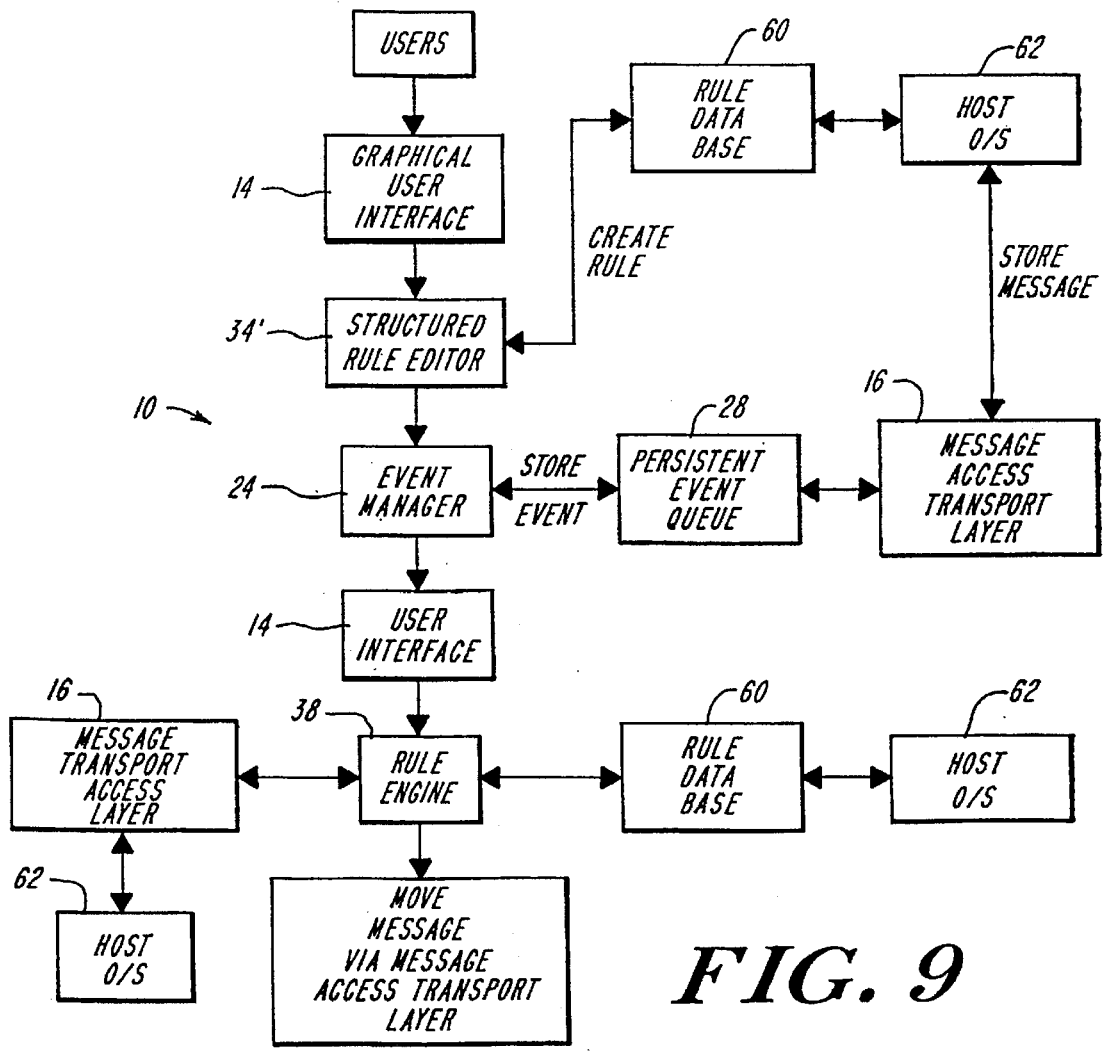
FIG. 9 is a block diagram of the rule based system of FIGS. 4 and 5 effecting a tickler feature as depicted in FIG. 8.

Referring now to FIGS. 7–9, an illustrative embodiment of one such structured rule editor is implemented in the context of a system resident tickler feature which enables the user to deal with received messages at a later time specified by the user. The system processes the message(s) and event(s) through automatic invocation of the rule mechanism so that the user is presented with the message to deal with at an appropriate time. Rule mechanism invocation is effected by the user, at the higher level of abstraction, through a graphical user interface.

The user selects the automatic tickle feature during reading, creating, replying or forwarding a message. A graphic user interface associated with the feature, as illustrated in FIG. 7, is presented having various fields available for the user to specify, which effect construction of a rule or rules according to the WHEN——>IF——>THEN construct discussed hereinbefore. The user is prompted by the higher level abstraction, e.g. the tickler interface, to specify a date and time on which the tickler will take action and to specify a folder into which the message is to be moved at the specified date and time. Optionally, the user can provide a textual reminder or note relating to the tickled message.

The user specified information entered into the tickler interface for the associated message, is used by the user interface 14 to construct a data structure, illustrated in FIG. 8, which defines an action to be invoked upon occurrence of the event, i.e. the tickle date and time. The messaging application 10 as discussed hereinbefore and illustrated in FIG. 9, processes the tickler data structure, including a pointer to the appropriate rule(s) or rule set(s), to construct the rule. The rule, including event, condition and action, is synthesized as the parameters entered into the user interface are passed to the structured rule editor to fill in underlying rule script(s). The rule constructed via the user interface 14 and the structured rule editor 34', is stored in the rule data base 60 accessible on the host operating system 62. The rule constructed is associated with an event, in this case a TICKLER event, which is stored by the event manager 24 in the persistent event queue 28 on disk. The event record stored in the queue points to the associated message, stored in the message store via the message access transport layer 16 and host operating system facilities 62, and points to the associated rule(s) or rule set(s) maintained in the rule database 60.

When the event occurs (i.e. the specified tickler date and time arrive), the event manager 24 fetches the event from the event queue 28 and passes it to the user interface 14, which polled for the occurrence of the event(s). The user interface 14 passes the event to the rule engine 38. The rule engine 38, receiving the event data structure, illustrated in FIG. 8, looks up the event's corresponding condition-action in the rule data base 60 through the host operating system. The rule engine 38 also calls the message store via the message transport access layer 16 and host operating system, to retrieve the message associated with the event. The rule engine 38, given the event occurrence and having the rule and associated message, then executes the rule by effecting performance of the specified action, which in the case of the tickler may be, among other things, an action generated by the structured rule editor to move the message to the folder specified by the user in the tickler graphical user interface.

Other structured rule editors, as described hereinafter, can be flexibly implemented for selectively invoking various conditions and actions in the event of receipt of new messages. In addition to tickler facilitation, new messages can trigger the testing of conditions and invocation of actions to provide a variety of functions within the context of a given electronic mail messaging system.

In the illustrative embodiment described herein, structured rule editors are implemented for automatically forwarding a new message without user intervention ("autoforward"), automatically moving or filing a message ("message clerk"), automatically replying, forwarding and/ or resending a message to a remote computer while the user is out of the office ("while I'm out"), and automatically cleaning out folders where messages are filed ("folder clerk"), deleting old messages based on how many there are and how long they have been in the folder. Such services, among others, implemented as structured rule editors, can be extensibly and portably implemented, as discussed hereinafter.

Figure 10:
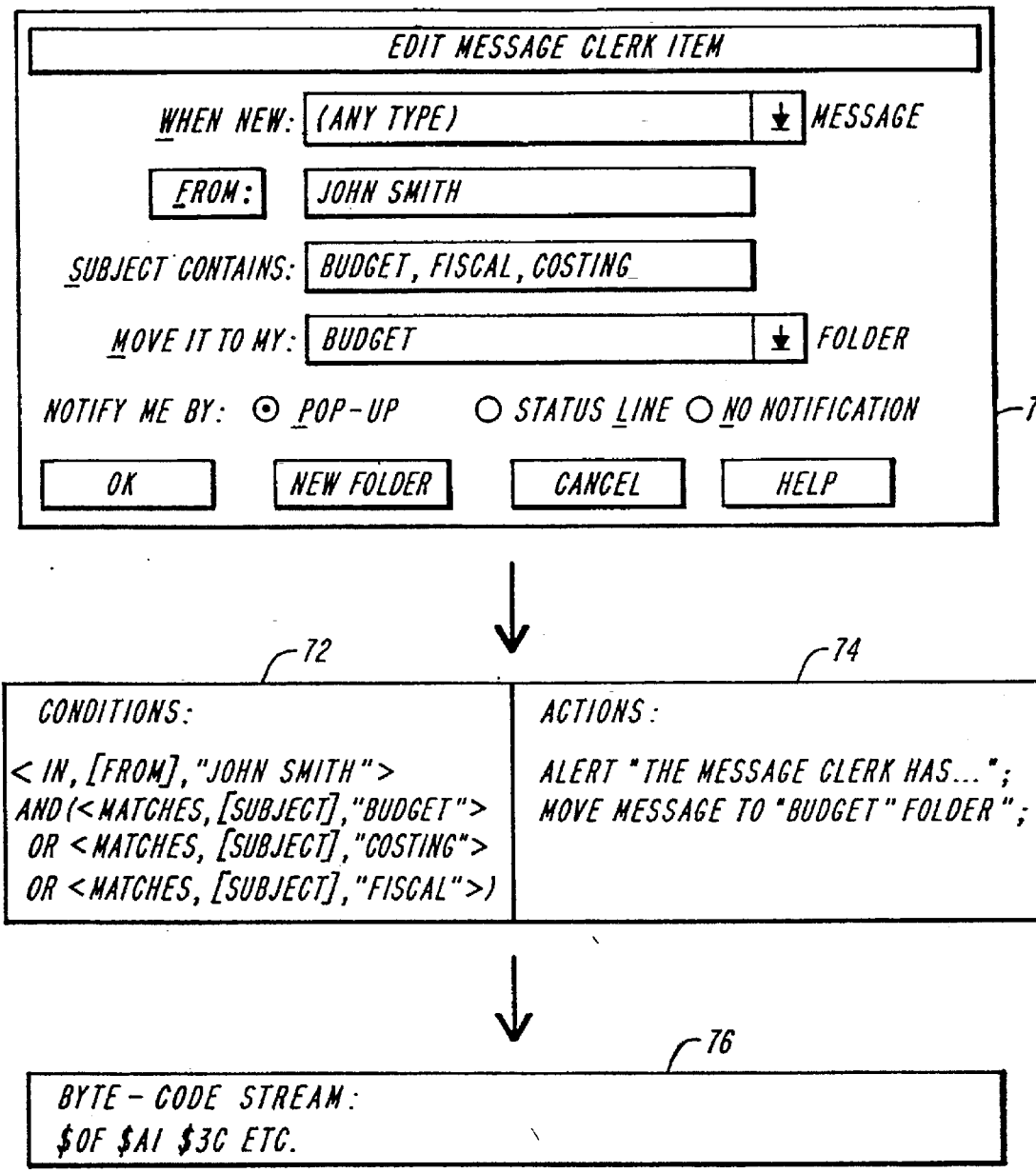
FIG. 10a is a structured rule editor template, synthesized rule syntax and representative byte-code stream illustrative of a message clerk structured rule editor.
FIG. 10b is a generic block diagram illustrative of structured rule editor compilation.
FIGS. 10c–10f are user interface templates for autoforward, while I'm out, and out of the office structured rule editors.
FIG. 10g is a user interface template for a folder clerk structured rule editor.

Such services can be invoked with respect to selected messages, based on user specified criteria such as the form of the message, who sent the message, and/or based on one or more words of the subject matter of the message. That is, upon the occurrence of the "event" of a new message, an "action" e.g. filing, forwarding, replying, is effected, "if" the new message is from a selected sender, is of a selected type and/or pertains to selected subject matter. Additionally, upon the occurrence of the event of a new message, the rule engine is invoked, if predefined conditions are met, to effect the action of moving the new message to a predefined area, e.g. folder. A user can specify, via a message clerk user interface 70 such as illustrated in FIG. 10, conditions relating to any new massage which, if satisfied, result in the moving of the new message to a selected folder. The user, by filling in a template, can specify any one or a combination of the conditions to be satisfied and the folder to which the message is to be moved.

Figures 10A, 10B:
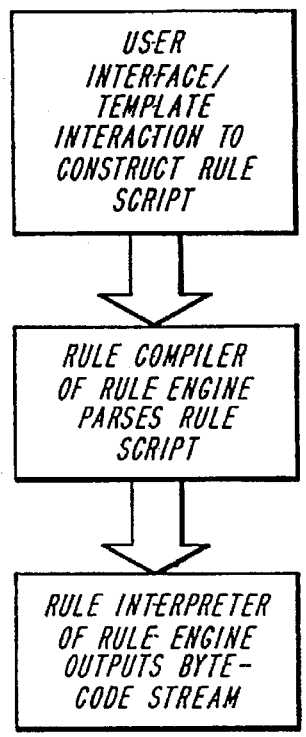

Rule synthesis in the context of structured rule editors, as illustrated in FIG. 10a and as discussed with respect to the tickler structured rule editor illustrated in FIG. 10, is begun by interaction of the user with the particular structured rule editor user interface 70. The template selections yield condition tuples 72 representative of the specified condition(s), and actions 74 which are a function of the underlying messaging system. A rule compiler in the rule engine (38, FIG. 4) compiles the synthesized rules into a byte code stream 76 which is stored in the rule data base accessible on the host operating system. The synthesized rule, in this case, has a New Message event data structure (FIG. 3a) associated with it. When the new message event occurs, the representative data structure is created and stored by the event manager (24, FIG. 5) in an event queue. The New Message event record stored in the queue points to a message stored as disclosed hereinbefore.

Similarly, a structured rule editor for forwarding new messages, autoforward, is effective upon the occurrence of a New Message event. The autoforward structured rule editor is initiated by user interaction with an autoforward structured rule editor template or user interface, such as illustrated in FIG. 10b. The autoforward facility, like the message clerk, permits specification of conditions for testing the form(s), sender(s), and subject matter of a new message. Additionally, autoforward permits testing of a new message to see if it was sent directly to the recipient and/or to see if the new message is sent urgent priority. Upon satisfaction of the selected conditions, autoforward will forward or resend the new message to a specified/selected recipient. A forwarded message can be sent with added text to the recipient, whereas a resent message is sent as a new message, without added text or any indication that it is other than an original message.

Figure 10D:
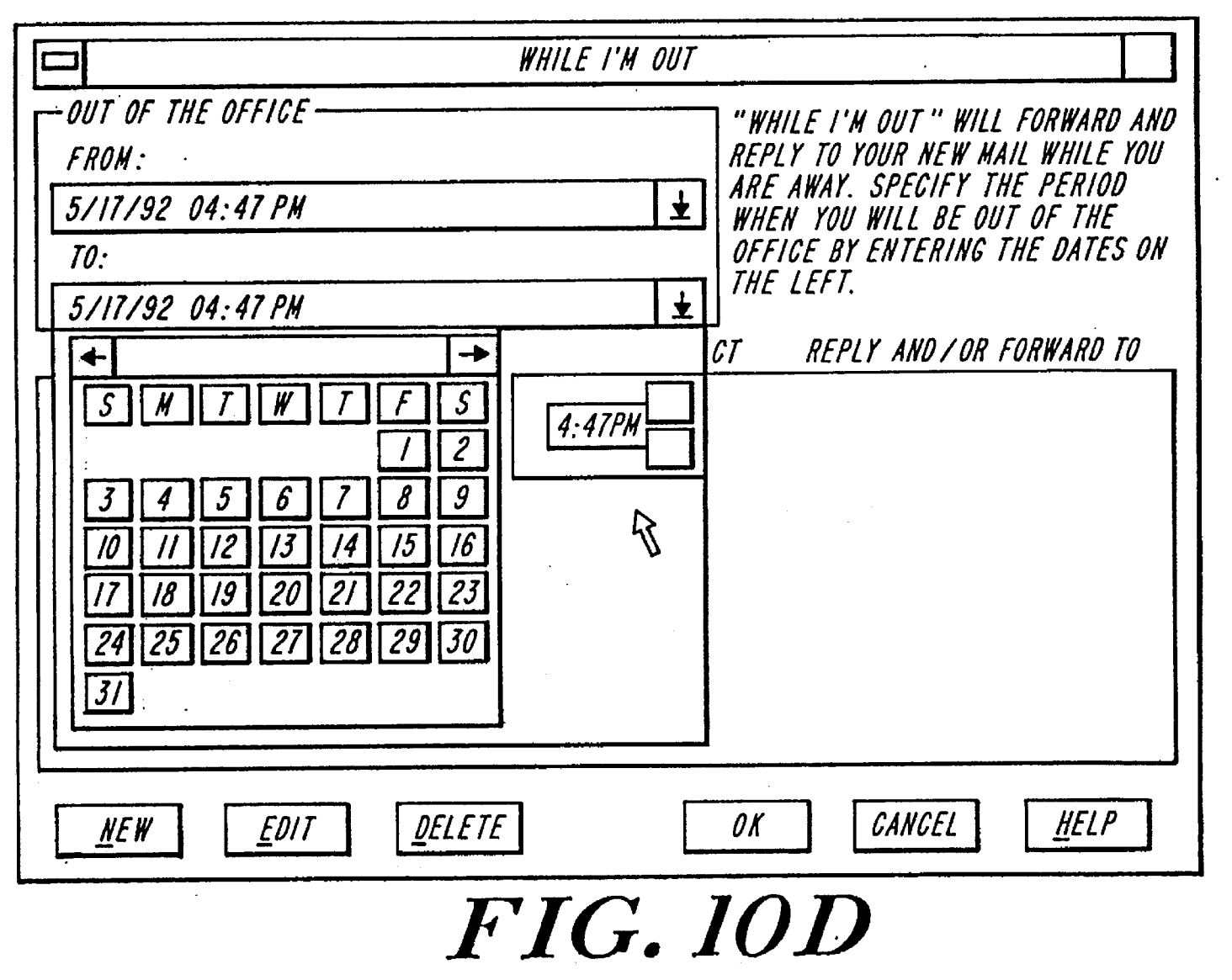

New messages can be forwarded or replied to automatically i.e., without user intervention, via a "while I'm out" structured rule editor. The user interacts with templates, such as illustrated in FIGS. 10c and 10d, to specify a reply to new messages received while the user is unavailable. The facility is effective during a time period (from:, to:), specified by the user. In one embodiment, illustrated in FIG. 10c, the time period (from:, to:) is typed in alphanumerically to indicate the period during which reply or resending is effective. Alternatively, a graphical interface in the form of a calendar, illustrated in FIG. 10d, permits a user to specify a time period by clicking a mouse on month, date and time indicia.

Figure 10E:
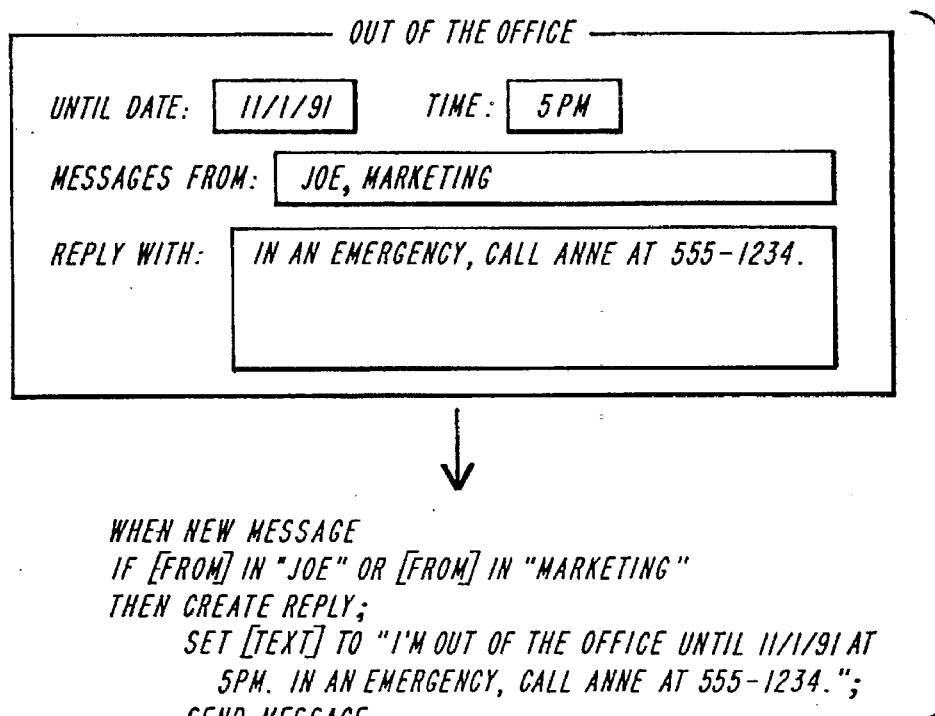

The "out of the office" feature is a prefabricated set of rules which a user invokes to process electronic mail messages received when the user is not in the office. A simple graphical user interface and associated rule sequence are illustrated in FIG. 10e. When the user selects "out of the office," an interface prompts the user for information including an indication of an "until date", i.e. a date and time until which the user wants the associated rule set invoked upon occurrence of a specified event type. The user can specify a source of messages which will invoke the out of the office rule(s) and can indicate a message that should be transmitted in response to messages from the specified source(s). The out of the office interface, while apparently not a rule specification, results in the synthesis of a rule set, as with the structured rule editors discussed hereinbefore.

The underlying rule set, for the "out of the office" structured rule editor, is event driven according to the invention and operative on NEW type message events only. The conditional (IF) portion of the rule is filled with parameters specified by the user in the interaction with the interface. As illustrated, the structured rule invokes an action (THEN) which creates and sends a message in reply to the messages satisfying the event and condition.

Figure 10F:
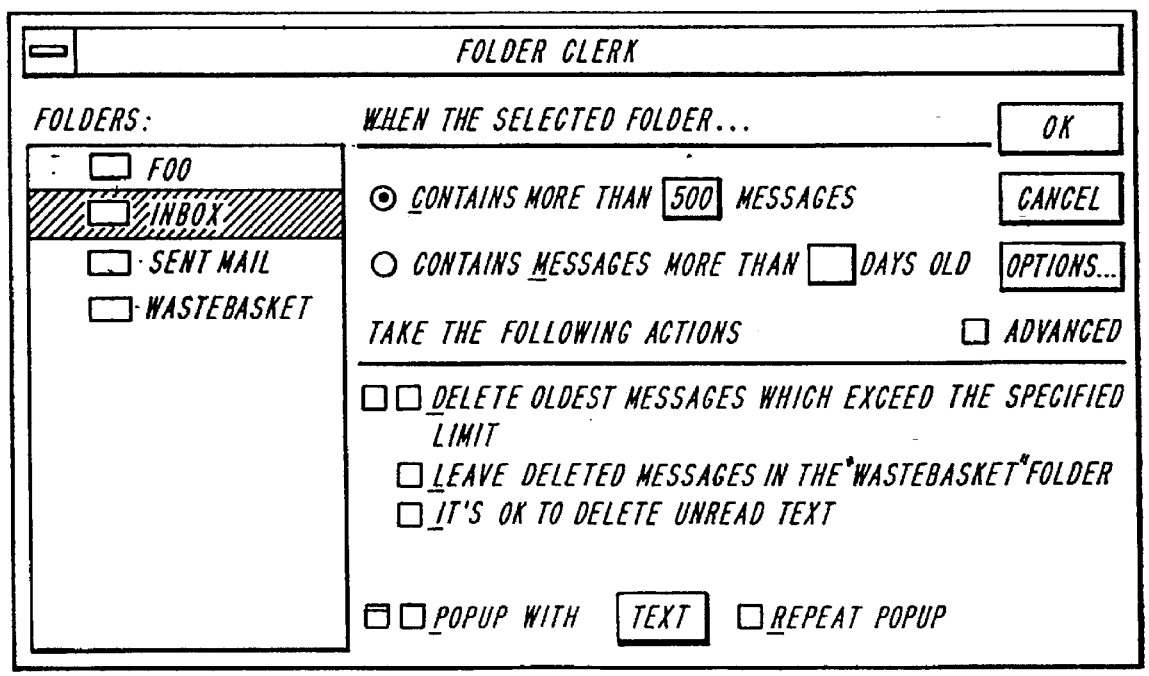

Using a "folder clerk" structured rule editor, invoked in accordance with either a STARTUP or PERIODIC event, non-new messages that accumulate in folders can be automatically tested (i.e. via the "if" portion of a tripartite rule mechanism according to the invention), for deletion from folders (the "action" undertaken if specified conditions are satisfied), based on how many messages there are in the folder and how long the messages have been there. The folder clerk template, illustrated in FIG. 10f, prompts the user to specify a message limit for folders and/or an age in number of days, which when tested may result in the action of deleting messages from the folder.

The structured rule editors, described hereinbefore are classified in rule sets which are prioritized to ensure that certain sets of rules fire before others. The rule engine/rule manager prioritizes while I'm out/out of the office rules over autoforward rules, which are in turn prioritized over message clerk rules. Thus, no conflict between rules occurs. Accordingly, it is functionally possible to receive a new message when out of the office, which will be replied to according to the out-of-the-office structured rule editor, subsequently forwarded according to the autoforward structured rule editor and then filed according to the message clerk structured rule editor.

Figure 11A:
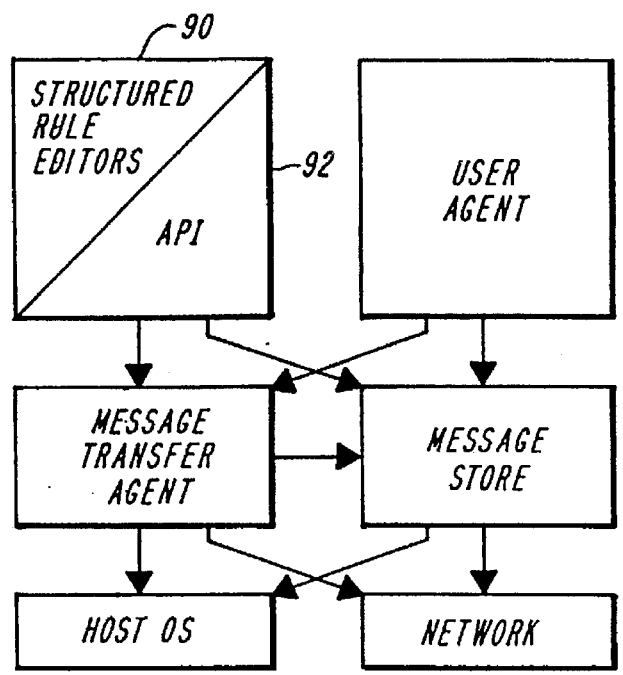
FIGS. 11a–11d are block diagrams of structured rule editors modularly implemented in various mail messaging systems.

The structured rule editor facilities can be extensibly and portably implemented in electronic mail messaging systems, such as illustrated in FIGS. 11a–11d. The structured rule editors are configured as a modular add-in application for electronic mail messaging systems and provide automated mailbox management as described hereinbefore. A generic structured rule editor module 90, referring now to FIG. 11a, is modularly integrated with an electronic mail messaging system via an associated structured rule editor application program interface (API) 92.

Figure 11B:
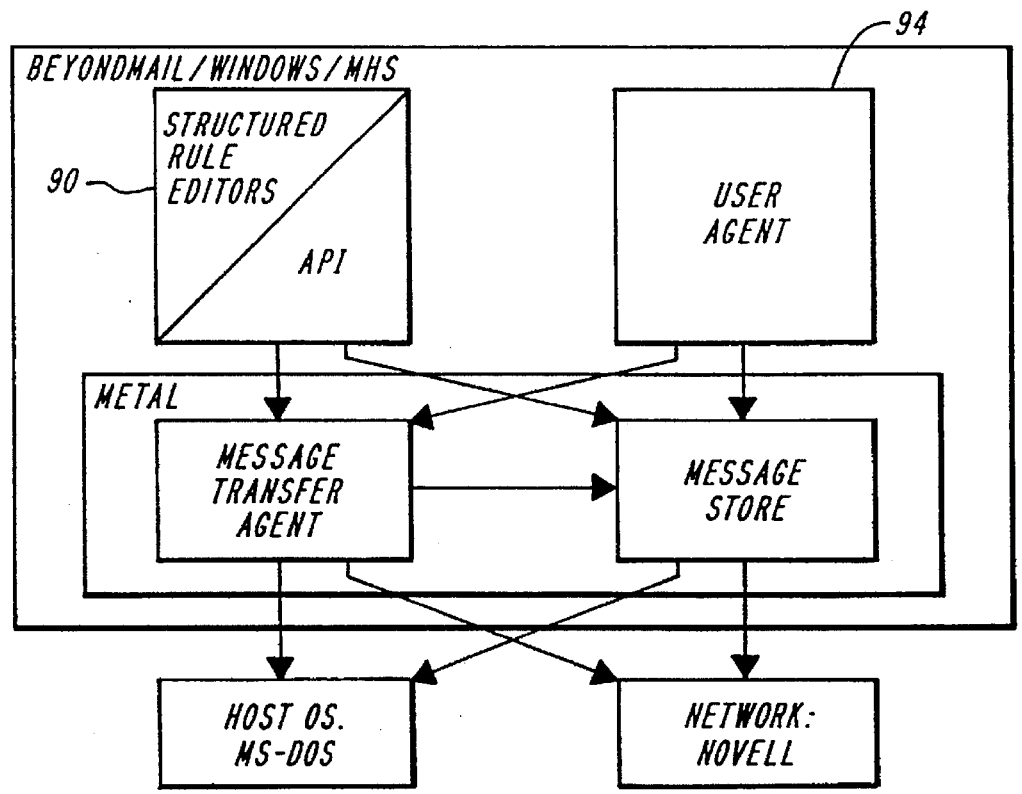

More particularly as illustrated generally in FIG. 11b, and as discussed hereinbefore, structured rule editors can be implemented modularly in the context of a user agent 94 providing a user interface and rule engine mechanisms for a user to read and compose mail accessible to a network through a host operating system, such as MS-DOS and network operating system such as Novell Netware.

Figure 11C:
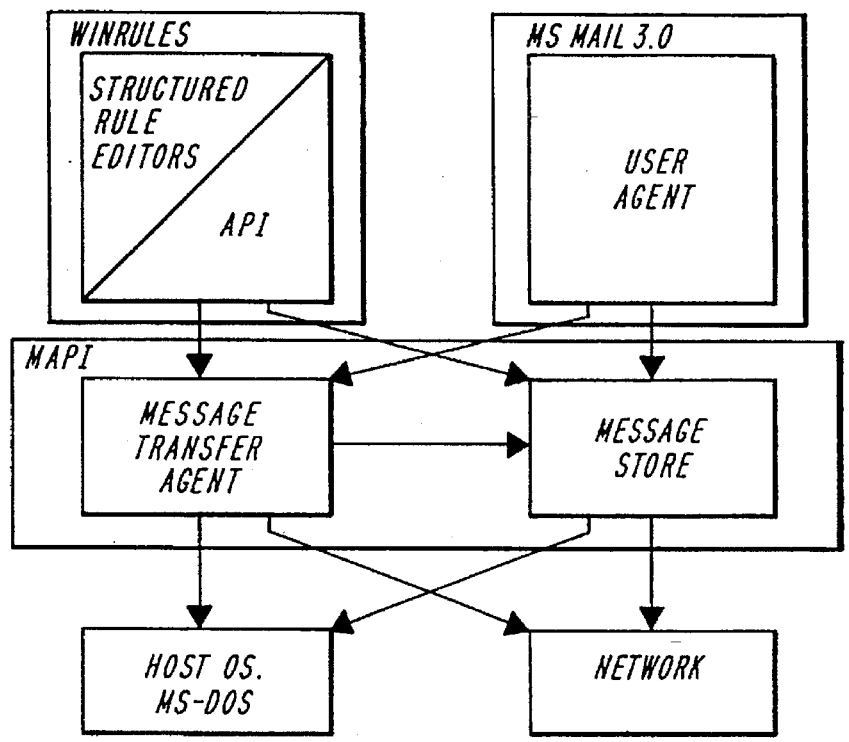

Similarly, the structured rule editors can be modularly implemented through an appropriate API in other environments, such as in the context of Microsoft Mail and associated Mail Application Program Interface (MAPI), illustrated in FIG. 11c, to provide higher level abstractions for manipulating messages using rules, such as WinRules, in accordance with Microsoft Mail Administrator Guide (WG 26123-0692) and Technical Reference, Microsoft Mail Electronic Mail for PC Network (WG 26128-0692), published by Microsoft Corp, and incorporated herein by reference.

Figure 11D:
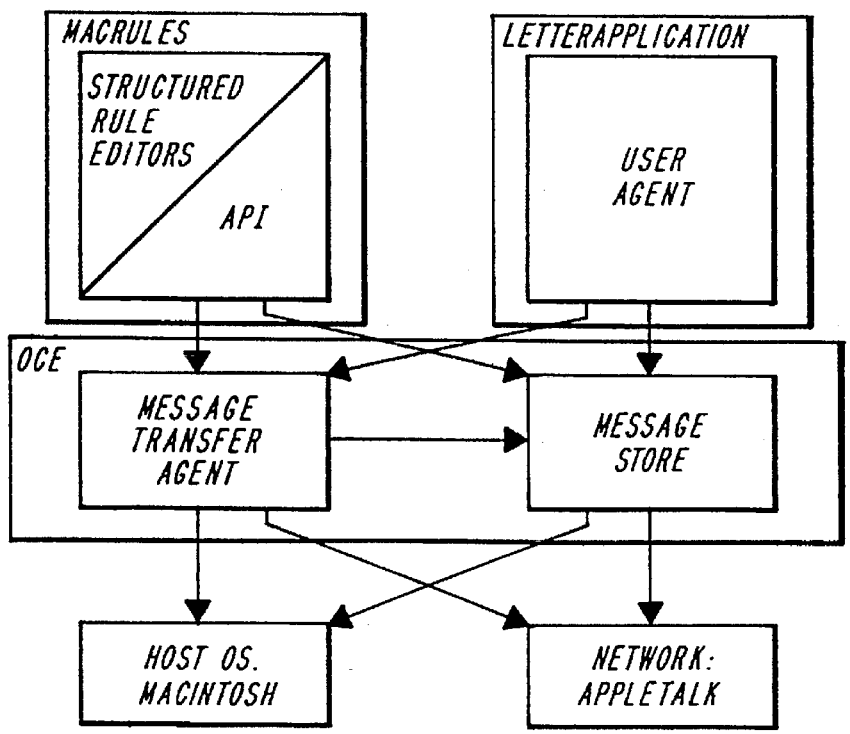

An environment such as the Apple Macintosh can be provided with modularly implemented structured rule editors as well, as illustrated in FIG. 11d, in accordance with Inside Macintosh Manual Set, published by Apple Computer Inc. and hereby incorporated by reference. The respective particulars of the various application program interfaces are a function of the particular environment in which the structured rule editor is modularly implemented and are coded accordingly, as appreciated by one of ordinary skill in the art.

Structured rule editors can be designed within the messaging system to reference a message (as with the tickler), or the rule syntax can be adhered to in structured rule editor designs using known external text editors (which obviously cannot reference a specific system resident message).

Within the system, rules are created in two ways according to the WHEN——>IF——>THEN construct. A form version of rules, as illustrated in FIG. 12a, provides the rule designer or user with a form having specific fields for the designer to fill in by selection, to create the rule(s). Field selection in the form permits the designer to interact with a user interface which partially hides syntax details from the rule designer.

An alternative rule design format, illustrated in FIG. 12b, uses a text mode within the rule editor, in which the rule designer must have familiarity with rule syntax. The more sophisticated user or rule designer can write more complicated rules using expressions having operators not available for selection in the form mode of rule design.

Still further, rule designers have an extensive open rule syntax, as set forth in Appendix I attached hereto and incorporated herein by reference, available externally for rule design. Rules can be created externally by the rule designer, via the syntax, using a text editor and then can be imported into the system for use in message manipulation by the user.

Figure 12C:
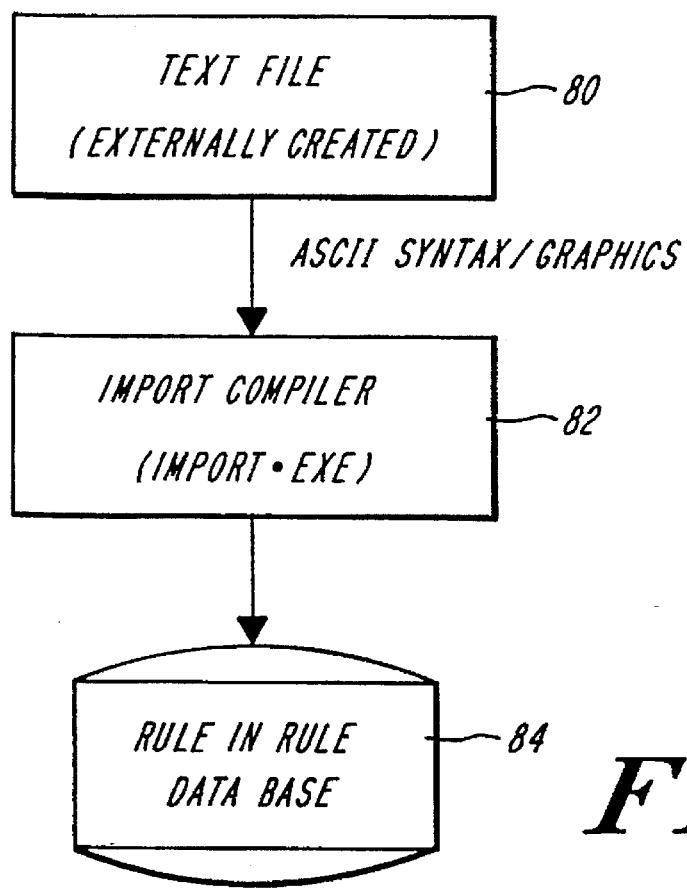
FIG. 12c is a block diagram of an external structured rule editor mode for rule creation.

As illustrated in FIG. 12c, a file 80 can be created and edited using an application external to the messaging system, such as Toolbook by Asymetrix Corp. The file 80, created using the referenced syntax, can include graphics and prompts to elicit responses by a messaging system user invoking the externally created rule application. The file 80 represents a structured rule editor which permits the user to invoke rules by interaction with the graphical interface and without any appreciation of rule syntax particularities. The externally text edited file 80 preferably results in an ASCII representation of the rule written according to the prescribed syntax. A messaging system importation facility 82 acts as a compiler which compiles the ASCII/syntax file 80 into a rule file 84 in accord with internally created rules. The rule file 84 is imported into the rule data base 86 for storage with other rules and for invocation upon occurrence of the event specified in the externally created rule.

Externally "prefabricated" rule sets associated with a respective graphical user interface (i.e. structured rule editors) can be used to implement various features in a rule based messaging system, as described hereinbefore.

Launching of known application programs, such as spreadsheet programs, word processing programs and other applications known in the art, can also be achieved from the rule based messaging system according to the invention. Launching, or spawning another application from the executing messaging application is integrated into the rule language by the use of a "launch" verb or action specified in the THEN(condition) portion of the WHEN——>IF——>THEN triplet.

A file sent or received as an attachment to a mail message, can be viewed and edited in the appropriate off-the-shelf program format by invoking the application program, i.e. launching into the attachment while maintaining the rule based messaging system for re-entry. A launchable attachment is made by making a file, in an off-the-shelf application format (such as Lotus 1-2-3), an attachment to a mail message. Such a file is attached by appending a copy of the file to the desired base message.

The messaging system according to the invention has a launch action which can be specified in the triplet, such as by:

WHEN(event)——>IF(condition)——>THEN launch "application".

The launch facility executes a known in the art memory switching program called HOLD EVERYTHING by South Mountain Software Inc., described in the Hold Everything user's manual which is incorporated herein by reference. The "application" specified with the launch verb is run on top of the messaging system, which is swapped to extended memory or disk while the application runs. Hold Everything restores the messaging system when the launched application is done. The launch verb, which can be specified for messages received having particular types of attached files for which the relevant application programs are available to the system, can be specified with parameters (i.e. "with keys") that are required as parameters or operands for the application program to be launched.

Although the invention is described in the context of a PC networked via Netware and running MHS electronic mail system, it will be appreciated by those of ordinary skill in the art that the messaging system according to the invention can be implemented via drivers and application program interfaces to various other electronic mail systems, such as DaVinci, 3+Open Mail, Banyan Vines Mail and the like.

While a particular set of "events", such as timer events, startup and exiting, etc, is disclosed herein for triggering rules for invocation, it can be appreciated that additional occurrences can be identified for establishing relevancy of a message for application of a rule, in accordance with the particulars of the underlying messaging system. Events, such as the changing of a message, sending a message, or the meeting of a quota, among others, can be used to trigger the application of a rule. Additionally, the system can be implemented so that user defined events can be specified.

Furthermore, although particular priority of events is discussed herein, alternative event prioritization may be implemented in systems according to the invention having alternative event functionality in alternative applications, as the primary considerations for prioritization are subtleties of the application design.

Message objects are disclosed herein as significant data formats for implementing the present invention. However it will be appreciated that while object data structures are suitable for use in the system described, and those known in the art, other methodologies and data structures, such as structured language data records, can be used in implementing a system according to the invention.

While graphical user interfaces and structured rule editors for tickler features and out of the office replying are illustrated and described herein, it can be appreciated that other structured rule editors, created either within the messaging system or externally, can be effected to implement other features such as scheduling, resource management and the like.

While a launch verb is discussed as integrating a known memory swapping program into the messaging system according to the invention, it will be appreciated that other launching mechanisms could be implemented and that various other verbs could be used to invoke various known application programs.

Figure 13A:
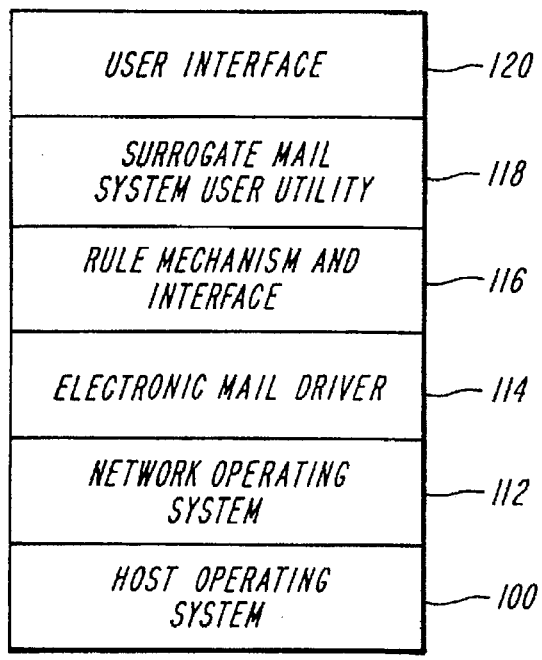
FIG. 13A is a simplified block diagram of an electronic messaging system environment for a facility running rules under system control with feedback.

A rule based messaging system having automated messaging and feedback capabilities, as illustrated in FIG. 13A, is also implemented in computer based systems and typically in networked personal computer systems. The personal computer system, such as an IBM PC or other computer, includes an operating system 100, such as DOS and/or Novell Netware and/or Microsoft Windows and networking facilities 112, upon which an electronic mail protocol 114 (e-mail) such as MHS is installed to facilitate mail message processing among computers connected via the network facilities. The rule based messaging mechanism, as discussed hereinbefore, comprises a rule mechanism and interface 116 (e.g. message transport access layer) to the electronic mail driver 114. Automated facilities are implemented in the rule based messaging system via a controller or surrogate mail system user utility 118. The rule based messaging mechanism and automated facilities are accessible to a user through a user interface 120, such as templates as known in the art or through a graphical user interface as described hereinafter.

Figure 13B:
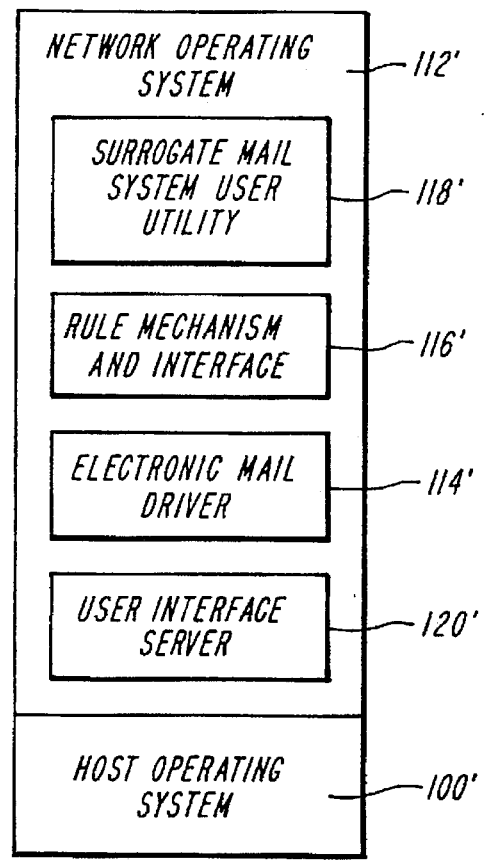
FIG. 13B is a simplified block diagram of an electronic messaging system facility for running rules under system control with feedback wherein the system is integrated into a network operating system environment.

Alternatively, as illustrated in FIG. 13B, the rule based messaging system having automated messaging and feedback described herein can be integrated with various network operating systems (NOS, such as Novell Netware and/or Banyan Vines), by incorporating the facilities as discussed herein into the NOS in accordance with NOS specific design considerations. For instance the surrogate mail user utility 118', rule mechanism and interface 116', electronic mail driver 114', and user interface 120' components of the rule based messaging system having automated messaging and feedback described herein can be can be implemented as a server based process (an NLM or Network Loadable Module in Netware or Service in Vines), as illustrated in FIG. 13B, in accordance the design considerations set forth in Netware 4.0 NLM Programming, published by Novell, or Vines Application Toolkit, Applications Programming for Vines published by Banyan Systems Inc.. In such an implementation, all functionality as described hereinafter occurs on the network server and the user interface 120' is effected through the Network Operating System user interface.

Figure 14:
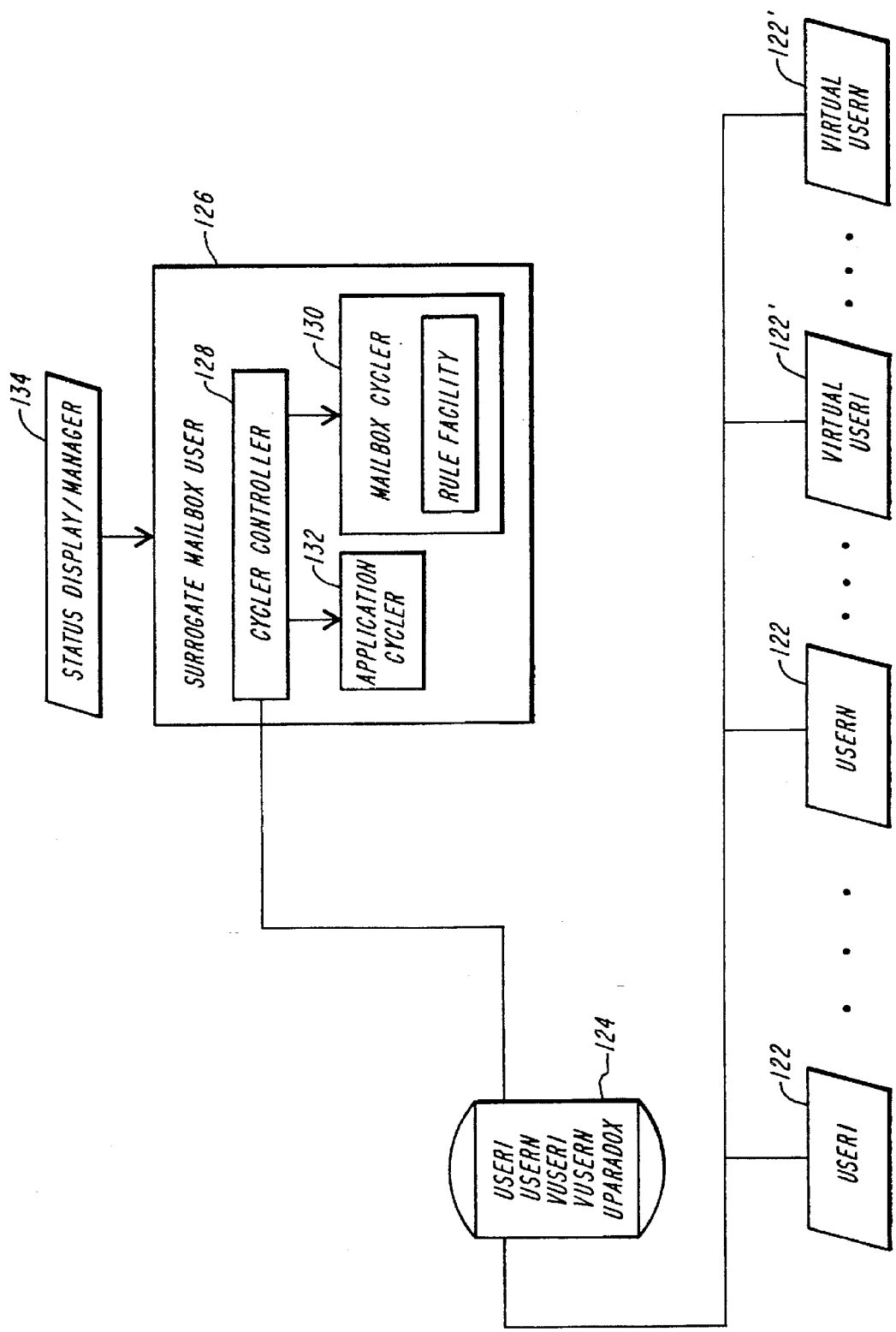
FIG. 14 is a simplified block diagram of an electronic messaging system with a facility for running rules under system control with graphical feedback.

Referring now to FIG. 14, in one embodiment the surrogate mail system user utility 118 is implemented as a basic user that facilitates the processing of mail, for one or a plurality of other users 122, without each user having to attend to actual starting of, or otherwise interact with, each user's copy of the mail messaging system. Each user 122 interfaces to the surrogate mail system user utility 118 through a textfile 124 stored on some appropriate storage device, such as a disk drive. The textfile 124 comprises a user-list-file including the identity of the user, the user's mailbox location, and the location of the user's e-mail post office. Users desiring to have their mailboxes automatically processed, have their respective user-list-file information included in the file 124. The user-list-file can contain real user names, virtual user names and application names for processing as described hereinafter. To maintain system integrity it is preferred to limit access to the user-list-file to the system administrator or users having system administrator privileges (at least the capacity to access other user's e-mail inboxes and/or other message repositories).

The surrogate mail system user utility 118 requires the designation of one of the users, or a dedicated workstation in the case of a rule server implementation discussed hereinafter, as a surrogate mailbox user 126. The surrogate mailbox user 126 is the system component that invokes the mail messaging facility on behalf of the "users" 122, 122' that have requested, by inclusion of their related information in the user-list-file, processing of their mail when they are not interactively connected to the mail messaging facility.

Users for which the service of the surrogate mailbox user 126 can be requested include real users 122, virtual users 122' or application programs. Real users 122 are real people who for some reason do not want to be, or cannot be, in attendance to interact with the mail messaging facility to process their messages (or for security reasons do not want to leave their workstations up and running the mail messaging facility). Real users 122 might invoke the services of the surrogate mailbox user 126, i.e. have their names included in the user-list-file 124, when they are to be out of the office for an extended period and want their incoming messages to be processed, such as by firing of rules which cause the message(s) to be forwarded to another user or responded to by a memo indicating the users date of return. Real users 122 might also include their names in the user-list-file 124 when they will be working for an extended period in another application or utility or on another system which would otherwise preclude them from availing themselves of the mail messaging facility.

Virtual users 122' are mail message enabled applications or program entities, not real people, that have rules or rule sets associated therewith. Virtual users 122' utilize the rule based messaging system and some other application, and can be implemented to utilize the surrogate mailbox utility to effect a virtually fully automated process. For example, the mail messaging system could include a virtual user named NEWLEAD. The mail messaging system would be configured having a user name NEWLEAD. Whenever a sales or telemarketing person gets a new sales lead, he or she fills out an electronic "form" with the lead information and sends it to user NEWLEAD. NEWLEAD's copy of the mail messaging system has rules that: (1) extract the lead information from the new message, launch a database application with a Sales Lead database, and enter the information into it; (2) send a message to the appropriate sales manager based on the location of the new lead; and (3) file the message in a tracking folder. The virtual user NEWLEAD utilizes the mail messaging system to receive and respond to messages and it utilizes the database application as well. The virtual user function can be further automated, by including it in the user-list-file, so that it is automatically invoked by the surrogate mail system user utility. It is significant to appreciate that the virtual user application (e.g. NEWLEAD) is a discrete mail messaging system user, and that it is a type of user that needs to read its new mail continually for the application to be effective (since sales leads can come in any time and require prompt responses). Thus, rather than dedicating a workstation to the NEWLEAD application so that its copy of the mail messaging facility is always running, it can be included on the user-list-file so that the surrogate mailbox user 126 polls NEWLEAD's mail and runs its rules periodically and continuously.

Third party applications programs, such as the database program Paradox, can also be run or launched by the surrogate mailbox user 126. By including pertinent application information, such as application name and relevant parameters, in the user-list-file, the application will be launched by the surrogate mailbox user when the third party application user-list-file entry is processed.

The surrogate mailbox user 126 comprises a cycler controller 128, a mailbox cycler 130 and an application cycler 132. The cycler controller 128 is a module which accesses the user-list-file 124 to get the application names and/or user name(s) and/or virtual user name(s) of users for which mail is to be processed without the user interacting with the mail messaging system. The cycler controller 128 processes the user-list-file users one at a time, and invokes the mailbox cycler 130 if the user name to be processed from the list is a real or virtual user. If the name to be processed from the list is that of a third party application, the cycler controller invokes the application cycler 132 to launch the third party application as discussed hereinbefore.

If the user name to be processed from the list is a real or virtual user, the cycler controller 128 invokes the mailbox cycler 130 to access the directories of the user, via the system administration privileges of the surrogate mailbox user 126, to start the copy of the mail messaging system of the user/virtual user whose name is accessed from the user-list-file. In the case where the user is a real user, i.e. non-virtual user, the mailbox cycler 130 accesses the inbox or other message repository of the user and runs that user's rules against that user's inbox to process that user's mail. In the case where the user is a virtual user, i.e. a mail enabled application having rules associated therewith, the mailbox cycler 130 accesses the inbox of the virtual user and runs that user's rules against that user's inbox to process that user's mail. When the virtual user's rule invokes a third party application, the application is launched by a launch facility associated with the underlying mail messaging facility, as opposed to the launch mechanism associated with the application cycler 132. Thus, it is required that the underlying mail messaging facility have a launching mechanism, such as the launch facility associated with the rule based electronic mail messaging facility discussed hereinbefore.

The cycler controller 128 processes each user in the user-list-file one at a time. The cycler controller 128 facilitates feedback, in this illustrative embodiment, by forwarding current mailbox information to a status display manager 134 and effecting storing of the status information in a log file. As each user's mailbox is being processed the status display manager effects display of status information, such as the name and/or pathname of the user mailbox being processed and the number of new messages for processing for that user. Status information related to rules and/or applications processed is also sent to the status display manager. The status display manager also receives and accounts for the present cumulative status of the surrogate mailbox user, facilitating the display of messages indicating the list of mailboxes being iterated and the number of passes iterated. When the cycler controller 128 processes the entire user-list-file 124 the cycler, re-accesses the user-list-file to get the list in case there were any changes, goes back to the top of the list and begins processing again. A delay can be implemented so that the cycler pauses between iterations through the user-list-file.

Figure 15:
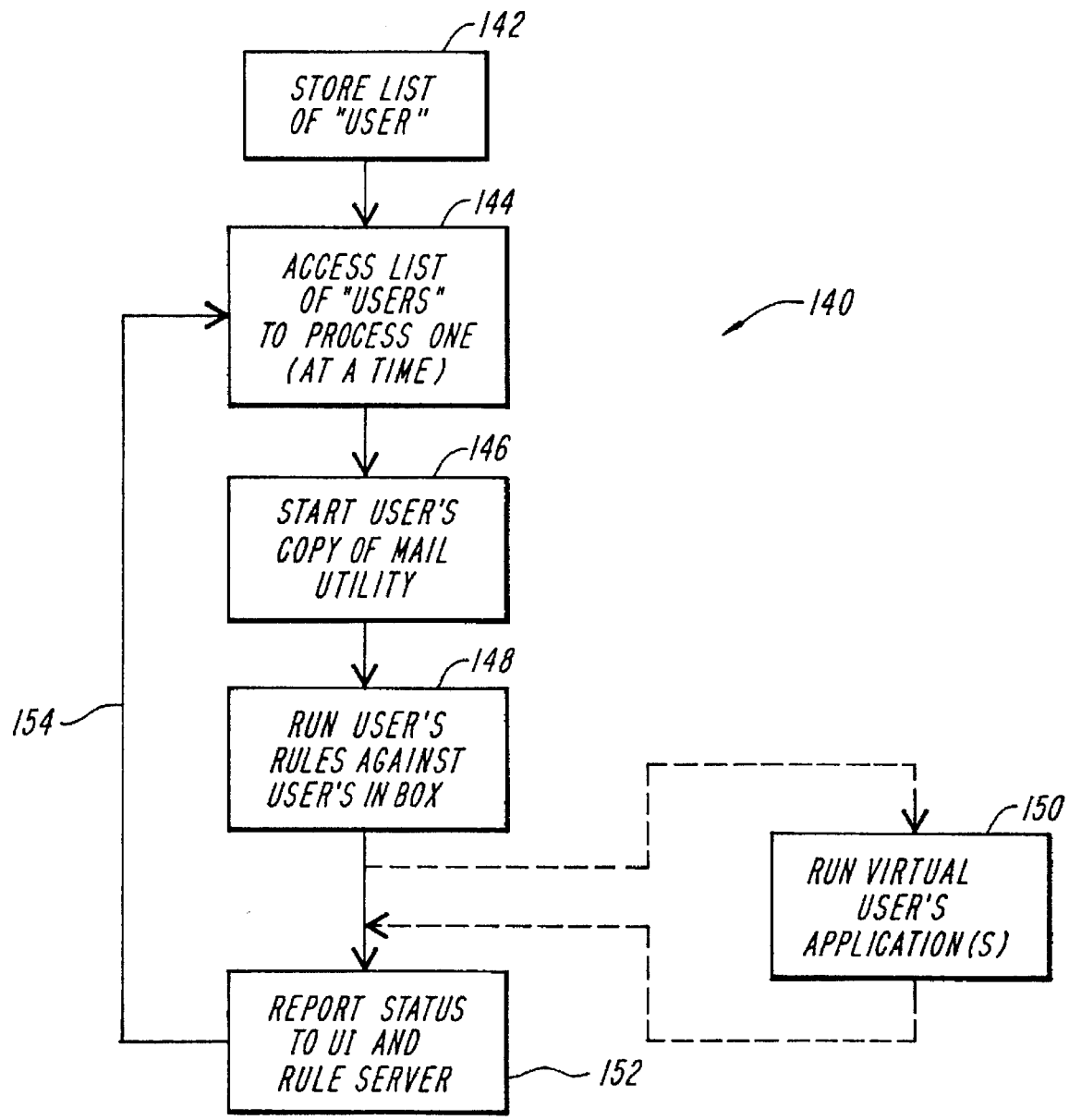
FIG. 15 is a simplified flow diagram of controller functionality for the electronic messaging system of FIG. 14.

The method for automatically processing electronic messages 140, as discussed hereinbefore, effected by the surrogate mail system user utility 118 is illustrated in FIG. 15. The names of users, real and virtual (and/or applications to be invoked by the application cycler 132), are stored in a file 142 which is accessed 144 by the surrogate mailbox user 126 so that each user can be processed, one at a time, by the cycler controller 128. The mailbox cycler 130 starts the user's copy 146 of the mail facility and runs that user's rules 148 against the user's inbox. If the user is a virtual user, the application(s) associated with the rule(s) are run as well 150. Status is reported 152 to the status display manager, stored and displayed. At the end of the user-list-file the list is accessed again and processed over again 154.

Figure 16:
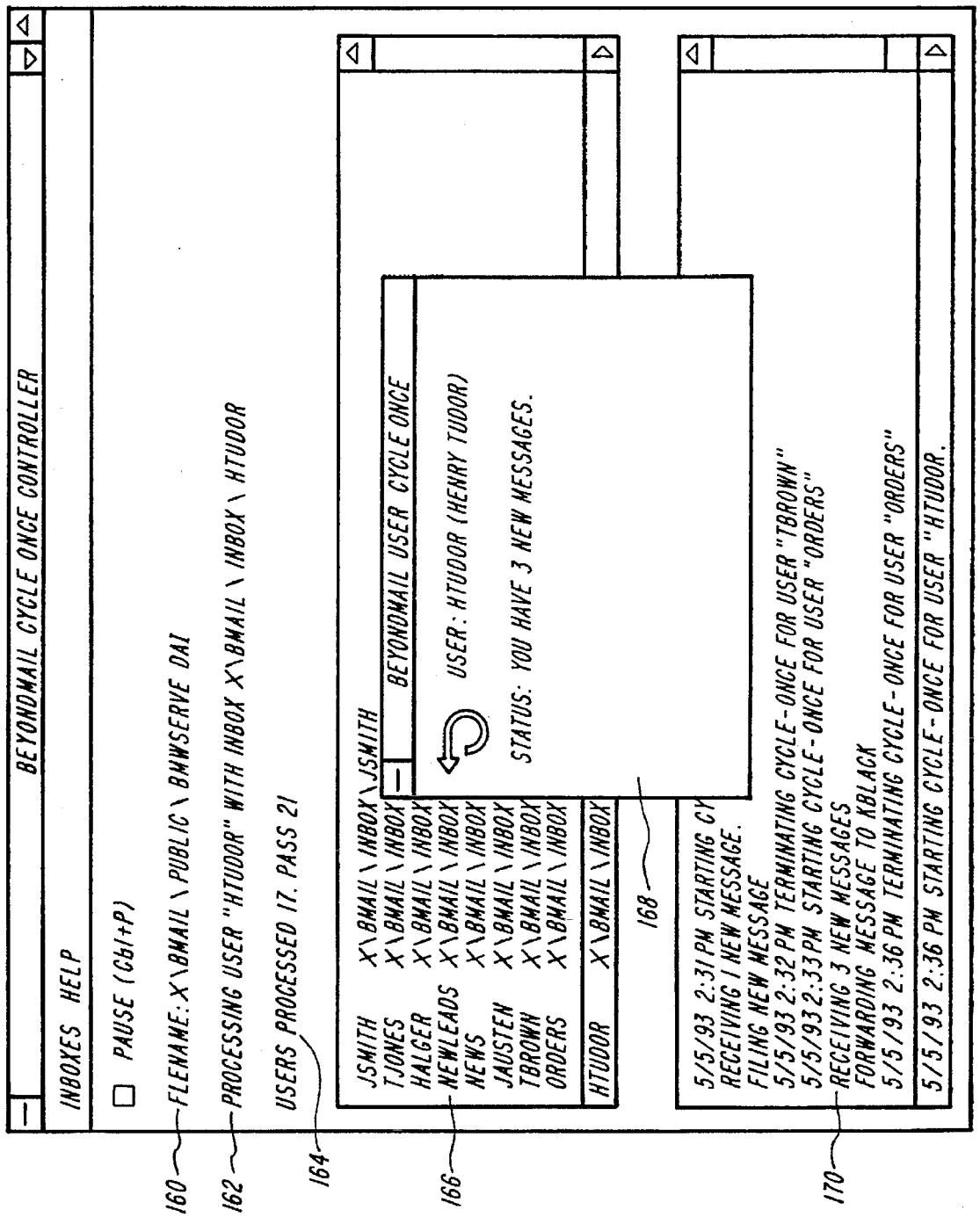
FIG. 16 is an illustrative screen dump from a status display manager indicating status of a messaging system facility for running rules under system control with feedback.

Referring now to FIG. 16, a screen dump illustrates some of the status information that can be presented by the status display manager. The status information illustrated, indicates the pathname 160 to the user-list-file from which users are being processed. The user presently being processed 162 is indicated as well as the number of users processed and the number of passes made 164. A list box 166 displays the users in the user-list-file. Status messages 168 for the user currently being processed are reported on a pop-up window. The information logged to the log file 170 is available for viewing and can include a log of users processed, mail received, rules run and status messages.

Figure 17:
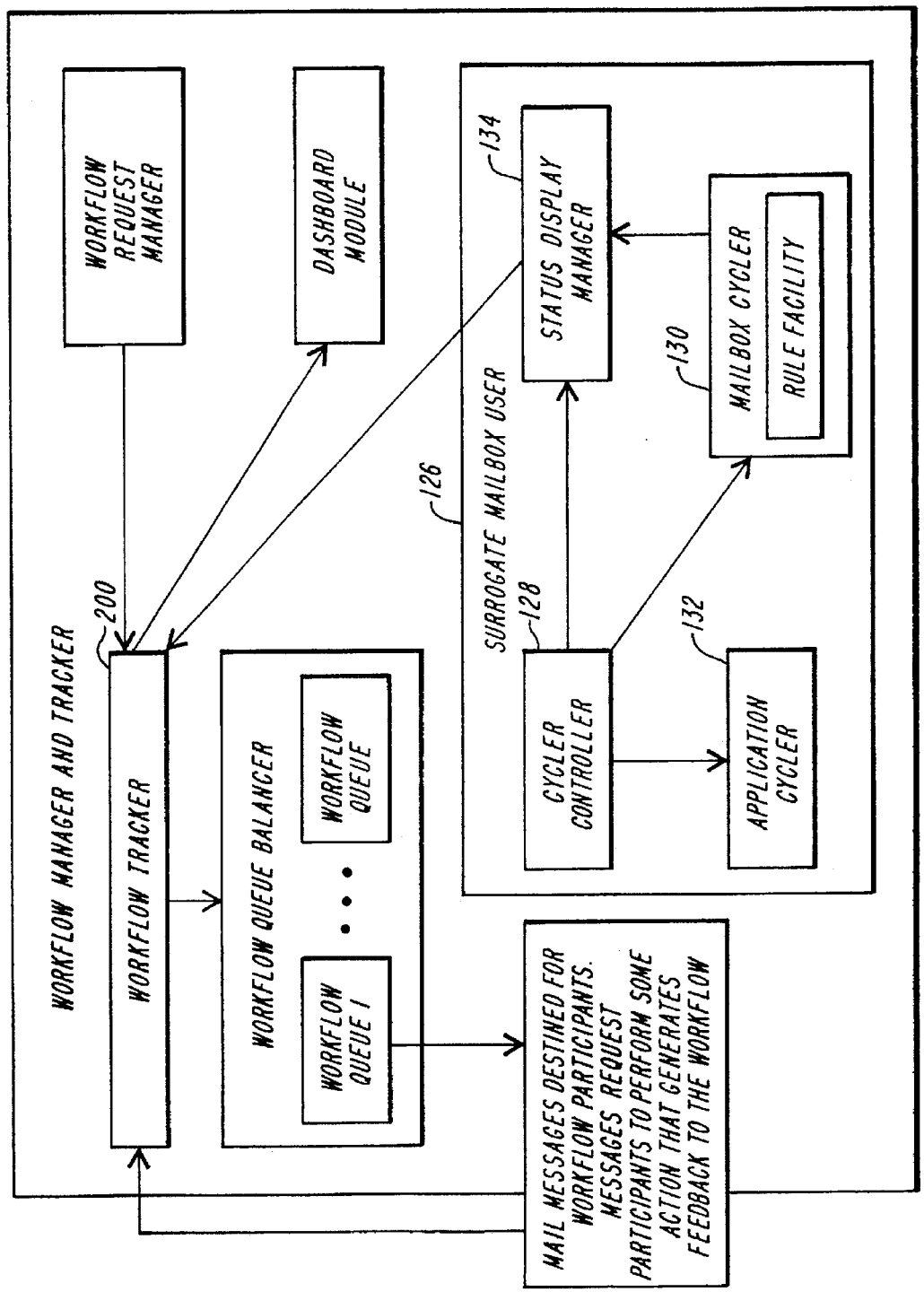
FIG. 17 is a block diagram of the messaging system facility for running rules under system control with feedback in a workflow administration implementation.

Upon firing of rules, status can be reported in the form of a text message which is displayed and logged. Messages can similarly be communicated by the status display manager to a workflow mechanism, in an embodiment wherein a dedicated rule server automatically running rules (and applications) is implemented. Such a workflow mechanism is illustrated in FIG. 17 and includes the surrogate mail system user utility and its surrogate mailbox user module 126 implemented on a dedicated workstation or rule server. Status information provided as feedback from the surrogate mail system user utility is used for workflow management. As the cycler controller 128 cycles through users and/or applications in the user-list-file and invokes the mailbox cycler 130 and/or application cycler 132 to start the messaging facility to fire rules and/or run applications, information is transmitted to the status display manager 134 for reporting and logging. The status display manager 134 also provides information to a workflow tracker 200 that is a component of a workflow manager and tracker utility. The information/status conveyed to the workflow tracker can be in the form of a text message transferred to the workflow tracker 200, as in the case of the textual status information presented by the status display manager 134 and illustrated in FIG. 16, or it can be information obtained by the workflow tracker 200 in polling the status of the status display manager 134.

The workflow tracker 200 obtains the status information which relates to a workflow. For example the status display manager 134 may generate status indicating that a rule generating a purchase request has been fired/processed. The workflow tracker 200, which is an application that implements rules and invokes other applications, processes requests to initiate, update and track workflows. The workflow tracker receives the status information and treats it as a request to initiate a workflow. Additionally, the workflow tracker may receive requests to initiate workflows from a workflow request manager 202 which fields workflow requests from external applications and forwards them to the workflow tracker 200, receiving status information on the workflow in return from the workflow tracker 200.

The workflow tracker 200 initiates the workflow in the form of a message, assigning the workflow some unique identifier (UID) to identify the workflow and its source and/or destination, which it passes to a workflow queue balancer 204. The workflow message takes a form particular to the type of workflow it represents, e.g. the workflow may consist of a message having all the information normally occurring in a purchase request such as item(s) requested, quantity, description, etc.

The workflow queue balancer 204, maintains and balances a plurality of workflow queues 206 receive workflow messages assigned by the workflow queue 206 that can most expeditiously handle the workflow. The workflow queues 206 issue the workflow messages to workflow participants, which perpetuate the workflow according to the routing normally associated with the particular nature of the workflow initiated. The workflow tracker 200 receives status updates from workflow participants relative to the progress and status of the workflow.

Figure 18A:
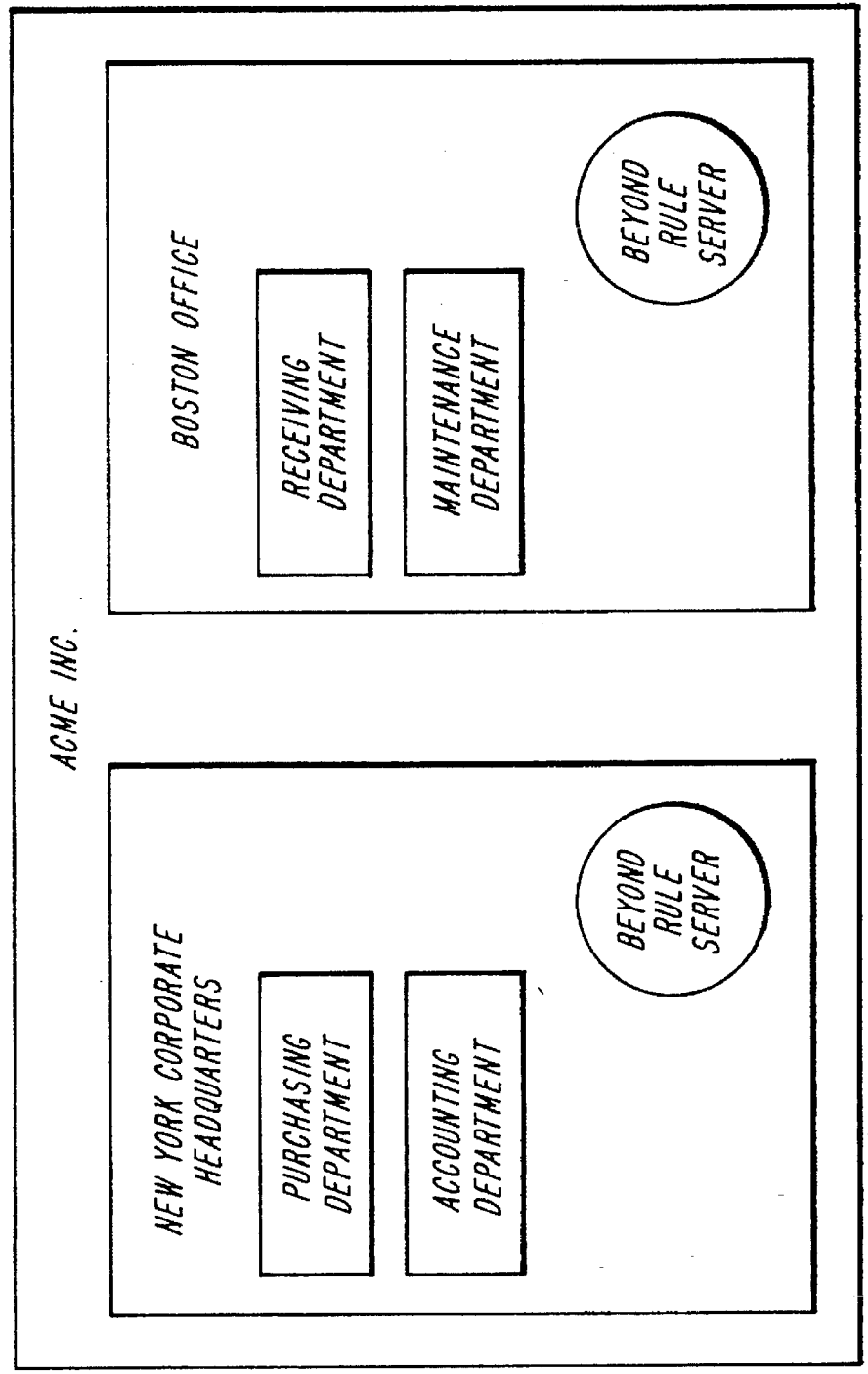
FIG. 18A is an illustration of an application for the workflow administration implementation of FIG. 17.
Figure 18B:
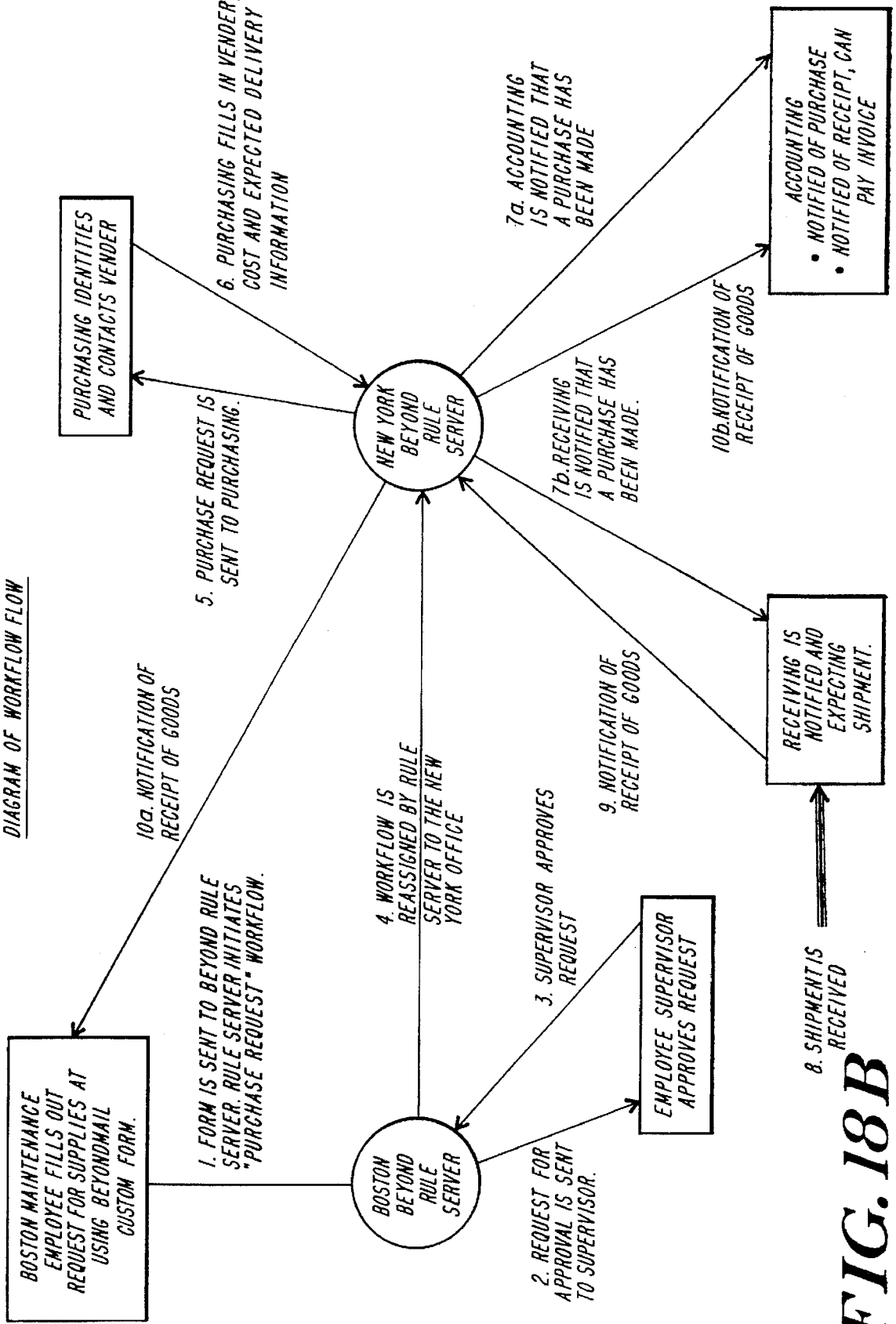
FIG. 18B is an illustration of workflow flow in the application for the workflow administration implementation of FIG. 17.

FIGS. 18A and 18B illustrate a potential application of a rule server implementation of an automated electronic messaging system with feedback, in a workflow administration capacity. FIG. 18A illustrates a potential organizational structure wherein the organization (Acme Inc.) has offices in Boston and New York each with a rule server 300 comprising an automated electronic messaging system with feedback implemented in a workflow administration capacity (Beyond Rule Server).

Referring now to FIG. 18B, the workflow is initiated when a maintenance employee from the maintenance department "fills out a request" and sends a form/message (1) requesting supplies through the messaging facility, i.e. either the work flow request manager 202 or surrogate mailbox user 126. The work flow tracker 200 initiates a work flow and a "request" is queued for approval by the work flow queue balancer 204 and issued by a selected work flow queue 206, requesting approval of a supervisor (2). The supervisor returns an approval message (3) to the rule server work flow tracker 200, which reassigns (4) the work flow to the New York rule server which is proximate to the purchasing department. The New York rule server, via the work flow request manager 202 causes the work flow tracker 200 in New York to issue a purchase request (5) which results in the purchasing department in New York contacting vendors. The purchasing department perpetuates the work flow by sending a work flow message indicating the vendor, cost and expected delivery information (6), sending the work flow through the work flow tracker 200 to the accounting department in New York indicating that the purchase had been made (7a). The work flow tracker 200, according to this illustrative work flow, initiates a work flow message that is queued for sending to the receiving department in Boston, to indicate that a purchase had been made (7b). The receiving department in Boston receives the work flow through the work flow tracker in the Boston rule server. When the shipment is received (8) a work flow message is shipped to the work flow tracker 200 in the New York rule server issuing notification of the receipt of the goods (9). The New York rule server issues notification to accounting in New York and the maintenance department in Boston that the goods have been received (10a, 10b).

Although the illustrative embodiment described herein refers to the controller starting the user's mail messaging facility and running that user's rules against that user's "in-box" of received messages and effects processing of the messages accordingly, it should be appreciated that the controller will start up that user's mail messaging facility and run that user's rules which may include rules based on events other than new message events. The controller will run rules relating to all events, including startup event rules and the like.

While the system described herein illustratively includes usernames (virtual and real) and application program names in a user-list-file that is processed serially, it should be appreciated that the user-list file can be processed in alternative sequences, such as according to some prioritization scheme.

Although in the illustrative embodiment described herein, rules are run against messages in a user's (or virtual user's) "inbox", it will be appreciated by those of ordinary skill in the art that rules can and will be run against messages in any selected repository, such as rules which reside in some public source.

Also, while a "user-list-file" is described for storing the names of users, virtual users and applications, it will be appreciated that such user names and applications can reside and be accessed by the system according to the invention in any of various repositories, including databases, hardware facilities such as RAM and/or ROM, public address books, or the like.

Although the invention has been shown and described with respect to an illustrative embodiment thereof, it should be understood by those skilled in the art that the foregoing and various other changes, additions and omissions in the form and detail thereof may be made without departing from the spirit and scope of the invention as delineated in the claims.

What is claimed is:

1. A method for automated processing of electronic messages in a rule based electronic messaging system, said rule based electronic messaging system including at least a first workstation and a second workstation, said first workstation including a first electronic mail utility and said second workstation including a second electronic mail facility for electronic communication therebetween, said method comprising the steps of:

storing in a file accessible to said first workstation at least one user name of at least one user of said second workstation;

accessing, via said first workstation, said file containing said at least one user name of said at least one user to retrieve said at least one username therefrom;

starting said second electronic mail facility with said first workstation without intervention of an actual user;

running said second electronic mail facility without intervention of an actual user to process rules for processing electronic messages of said at least one user; and reporting status of said step of running said second electronic mail facility to process said rules for processing electronic messages of said at least one user.

2. The method of claim 1 wherein said rules for processing electronic messages comprise an event portion, a condition portion and an action portion, said event portion specifying at least one of a plurality of types of events which upon occurrence initiate evaluation of said condition portion, said condition portion specifying at least one condition which if satisfied initiates execution of an action specified in said action portion.

3. The method of claim 2 wherein said at least one username includes a virtual username and at least one of said rules for processing electronic messages for said at least one user includes an action portion that specifies initiating an application program external to the messaging system.

4. The method of claim 2 wherein selected ones of said plurality of types of events are selected from a group of events consisting of: receiving said message at said apparatus, first time reading of said message received at said apparatus, filing of said message in a specified folder, expiration of a specified period of time, occurrence of a specified date and time, starting up of said messaging system, shutting down of said messaging system, pushing of a button on said user input device, clicking of a mouse cursor on an icon of a display in said messaging system, initiation of communication between said messaging system and an external device, and dropping of an icon into a drop well on a display in said messaging system.

5. The method of claim 1 wherein said at least one username stored in said file comprises a plurality of usernames including a first username and a last username, and said steps of starting, running and reporting are performed for each username in succession from said first username to said last username whereupon said first username is again processed and said steps of starting, running and reporting are performed for each username in succession.

6. The method of claim 1 wherein said step of accessing said file containing at least one user name comprises copying said at least one username into a memory location accessible by said first workstation.

7. The method of claim 1 wherein said at least one username includes a real username.

8. The method of claim 1 wherein said step of storing in a file accessible to said first workstation at least one user name of at least one user further includes storing a name of an application program external to the messaging system and said step of running said second electronic mail facility to process rules for processing electronic messages of said at least one user further includes running said application program.

9. The method of claim 1 wherein said step of reporting status of said step of running includes displaying said status on a user readable display.

10. The method of claim 1 wherein said step of reporting status of said step of running includes storing said status in a log file.

11. Apparatus for connection to a network for sending messages from said apparatus and for receiving messages from at least one other network connected device, comprising:

storage having a username for at least said at least one other network connected device;

a processor accessing said storage to retrieve said username and processing messages sent to said at least one other network connected device in accordance with at least one of a plurality of rules, said at least one of said plurality of rules comprising an event portion, a condition portion and an action portion, said event portion specifying at least one of a plurality of types of events which upon occurrence initiate evaluation of said condition portion, said condition portion specifying at least one condition which if satisfied initiates execution of an action specified in said action portion, said processor including a mailbox processor cycling through messages sent to said other network connected device and executing said at least one of said plurality of rules and performing said action specified in said action portion of said at least one of said plurality of rules on at least one of said messages; and at least one status processor receiving status information from said processor indicating status of processing of said at least one of said messages.

12. The apparatus of claim 11 further including at least a second other network connected device and wherein said processor further includes a controller cycling said at least said other network connected device and said second other network connected device in accordance with a retrieved username and invoking said mailbox processor for each of said at least said other network connected device and said second other network connected device to execute said at least one of said plurality of rules and perform said action specified in said action portion of said at least one of said plurality of rules on at least one of said messages.

13. The apparatus of claim 12 wherein said storage further includes an application program name and said apparatus further includes an application processor and wherein said controller invokes said application processor to run said application program when said controller retrieves said application program name from said storage.

14. The apparatus of claim 11 wherein said apparatus includes a network operating system coordinating communication between said at least one other network connected device and at least a second other network connected device.

15. The apparatus of claim 11 wherein said storage further includes a virtual username and at least one of said plurality of rules includes an action portion that specifies initiating an application program.

* * * * *